(12) United States Patent
Bauer et al.

(10) Patent No.: US 9,520,128 B2
(45) Date of Patent: Dec. 13, 2016

(54) FRAME SKIPPING WITH EXTRAPOLATION AND OUTPUTS ON DEMAND NEURAL NETWORK FOR AUTOMATIC SPEECH RECOGNITION

(71) Applicant: Intel Corporation, Santa Clara, CA (US)

(72) Inventors: Josef Bauer, Munich (DE); Piotr Rozen, Gdansk (PL); Georg Stemmer, Munich (DE)

(73) Assignee: Intel Corporation, Santa Clara, CA (US)

( * ) Notice: Subject to any disclaimer, the term of this patent is extended or adjusted under 35 U.S.C. 154(b) by 5 days.

(21) Appl. No.: 14/493,434

(22) Filed: Sep. 23, 2014

(65) Prior Publication Data

US 2016/0086600 A1    Mar. 24, 2016

(51) Int. Cl.
*G10L 15/02*    (2006.01)
*G10L 15/16*    (2006.01)
*G10L 15/12*    (2006.01)
*G10L 15/08*    (2006.01)

(52) U.S. Cl.
CPC .............. *G10L 15/16* (2013.01); *G10L 15/08* (2013.01); *G10L 15/12* (2013.01); *G10L 15/02* (2013.01)

(58) Field of Classification Search
CPC ...... G10L 15/02; G10L 15/063; G10L 13/033; G10L 13/06; G10L 13/07; G10L 15/07; G10L 15/142; G10L 15/18; G10L 15/1815; G10L 15/22; G10L 15/285; G10L 2015/0631; G10L 2015/0638; G10L 15/005; G10L 15/08; G10L 15/16; G10L 15/32; G10L 19/0018; G10L 21/0205; G10L 21/0232; G10L 21/0364; G06F 17/273; G06F 17/289

USPC ....... 704/243, 251, 235, 240, 242, 245, 255, 704/257, 10, 231, 232, 233, 236, 238, 704/239, 246, 247, 249, 250, 254, 256, 704/256.8, 260, 265, 266
See application file for complete search history.

(56) References Cited

U.S. PATENT DOCUMENTS

| | | | | |
|---|---|---|---|---|
| 5,600,753 A | | 2/1997 | Iso | |
| 5,615,299 A | * | 3/1997 | Bahl | G10L 15/02 704/233 |
| 5,920,836 A | * | 7/1999 | Gould | G09B 19/04 704/240 |
| 6,073,097 A | * | 6/2000 | Gould | G09B 19/04 704/240 |
| 6,208,963 B1 | * | 3/2001 | Martinez | G06K 9/6268 704/232 |

(Continued)

FOREIGN PATENT DOCUMENTS

EP    1576580 B1    2/2012

OTHER PUBLICATIONS

Vanhoucke, et al., "Multiframe Deep Neural Networks for Acoustic Modeling", Google, Inc., May 26-31, 2013, 4 pages.

(Continued)

*Primary Examiner* — Vijay B Chawan
(74) *Attorney, Agent, or Firm* — Green, Howard & Mughal, LLP

(57) ABSTRACT

Techniques related to implementing neural networks for speech recognition systems are discussed. Such techniques may include implementing frame skipping with approximated skip frames and/or distances on demand such that only those outputs needed by a speech decoder are provided via the neural network or approximation techniques.

21 Claims, 9 Drawing Sheets

(56) References Cited

U.S. PATENT DOCUMENTS

| | | | | |
|---|---|---|---|---|
| 6,490,561 | B1* | 12/2002 | Wilson | G10L 15/02 704/231 |
| 6,957,203 | B2 | 10/2005 | Keeler et al. | |
| 7,567,896 | B2* | 7/2009 | Coorman | G10L 13/07 704/10 |
| 7,590,537 | B2* | 9/2009 | Kim | G10L 15/07 704/236 |
| 8,442,821 | B1* | 5/2013 | Vanhoucke | G10L 15/14 704/232 |
| 8,515,751 | B2* | 8/2013 | Zanolin | G06F 17/273 704/235 |
| 8,751,238 | B2* | 6/2014 | James | G10L 13/033 704/260 |
| 2005/0182626 | A1* | 8/2005 | Kim | G10L 15/07 704/245 |
| 2005/0182629 | A1* | 8/2005 | Coorman | G10L 13/07 704/266 |
| 2010/0121638 | A1* | 5/2010 | Pinson | G10L 15/02 704/235 |
| 2012/0265534 | A1* | 10/2012 | Coorman | G10L 13/033 704/265 |
| 2014/0142929 | A1 | 5/2014 | Seide et al. | |

OTHER PUBLICATIONS

International Search Report and Written Opinion of the International Searching Authority for International Application No. PCT/US2015/045750, mailed on Nov. 27, 2015, 12 pages.

Qifeng Zhu et al., "Using MLP features in SRI's conversational speech recognition system," Proceedings of Interspeech, pp. 2141-2144, Sep. 2005.

* cited by examiner

1000

1100

Evaluate a Neural Network to Determine a First Distance Value as an Output of the Neural Network
1101

Approximate a Second Distance Value for a Subsequent Time Instance based on the Neural Network Determined Distance Value
1102

Determine a Sequence of Textual Elements based on the First and Second Distance Values
1103

FRAME SKIPPING WITH EXTRAPOLATION AND OUTPUTS ON DEMAND NEURAL NETWORK FOR AUTOMATIC SPEECH RECOGNITION

BACKGROUND

Neural networks including deep neural networks may be used for machine learning and perceptual and cognitive systems. Such neural networks may be used in a variety of implementations such as speech recognition systems. For example, neural networks may include interconnected layers of neurons or nodes. Input values for each layer include inputs to the system (e.g., at the input layer) or outputs from a previous layer in the neural network. Output values from the output layer of the neural network may include output values, distance values, or classification values, or the like such that the input to the neural network may be classified via the neural network and/or additional processing. Such neural network processing and classifications may be used to perform classifications or other tasks that may be difficult or impossible to perform with more standard rule-based processing systems.

As discussed, such neural networks may be implemented in automatic speech recognition (ASR) systems and, in some implementations, they may be the most important component of such systems. A problem with current neural networks in real-time applications is the large computational effort needed to evaluate the neural network. To address this problem, some current implementations offload neural network computations from a central processing unit (CPU) of a device to a graphics processing unit (GPU) of the device. However, such offloading may cause conflicts with other GPU-intensive applications such as games being run on the device or the device's camera or the like. Furthermore, intensive use of the device's GPU may increase power usage and thereby limit battery life for mobile devices. In other implementations, single instruction, multiple data (SIMD) platforms and/or optimizations such as batched lazy evaluation models (which may delay calculations until needed) may be used. However, such implementations may have reduced classification accuracy.

As such, existing techniques do not provide real-time, efficient, and accurate neural network implementations. Such problems may become critical as the desire to utilize classifications via neural networks such as in speech recognition becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
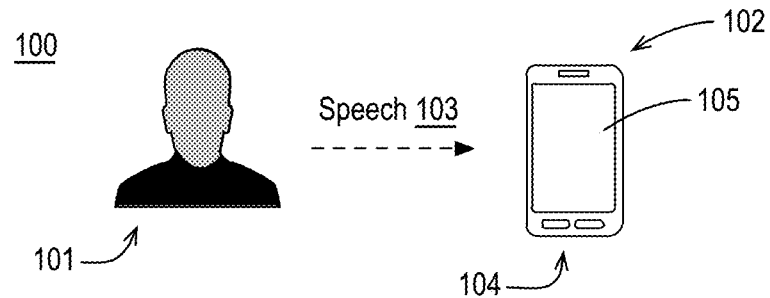
FIG. 1 is an illustrative diagram of an example setting for providing speech recognition.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to neural networks implemented for speech recognition and, in some examples, to frame skipping techniques and output values on demand techniques implemented via the neural network.

As described above, implementing neural networks in real time may be advantageous to users but difficult due to limited computational resources and intensive use of battery resources. Furthermore, attempts to reduce such resource usage may provide inaccurate classification results. Optimizing neural networks may have a direct correlation to total cost of ownership in services hosted via a data center and to battery life in applications implemented via a mobile device.

In some embodiments discussed herein, frame skipping techniques may be implemented via a neural network. For example, when using frame skipping, neural network outputs (e.g., distance values) may be calculated or determined for every $N^{th}$ time instance or frame. For time instances where neural network distance values are not determined, such distance values may be approximated based on neural network determined distance values from one or more prior time instances or frames. For example, evaluating the neural network may be computationally complex as, in some examples, the entire neural network is evaluated at that time instance or for that frame. Distance values determined by approximation methods may be computed with much less computational complexity (and without evaluation of the neural network). For example, approximated distance values may be determined by extrapolation techniques using one or more prior frames of distance values. In some examples, the extrapolation may include a linear extrapolation based on distance values from two previous frames. As used herein, evaluation frames or non-skip frames refer to distance values determined by evaluation of the neural network and skip frames refer to distance values determined by approximation techniques. Such frame skipping combined with approximation of distance values for skip frames may provide substantial computational savings with no or minimal cost of speech recognition accuracy as is discussed further herein.

Furthermore, in some embodiments discussed herein, neural network outputs (e.g., distance values) on demand (e.g., distances on demand or DOD) techniques may be implemented via a neural network. For example, when using distances on demand techniques, a downstream decoder such as a speech decoder may provide, for a time instance or frame, requested distance values that are a subset of all available distance values. For example, a speech decoder such as a Viterbi beam searching decoder may, for a particular time instance, only require a subset of the distance values available from the neural network. In such examples, the speech decoder may provide output indices (e.g., indicators of which outputs or distance values are needed for a particular time instance) to the neural network. The neural network, as is discussed further herein, may include an input layer, one or more hidden layers, and an output layer. For example, outputs or distance values from the output layer may be provided to the speech decoder. Since, in some examples, each node of the output layer is connected to every node of the final hidden layer (e.g., the hidden layer connected to the output layer), the final hidden layer must be fully evaluated to evaluate even one node of the output layer. Therefore, in some examples, the neural network may be fully evaluated through the final hidden layer, but only the subset of nodes associated with the requested output indices may be evaluated. By not evaluating non-requested output nodes, substantial computational savings may be made, particularly when the output layer is a substantial portion of the entire neural network as is the case in many implementations.

In some embodiments, such frame skipping techniques and such distances on demand techniques may be combined. For example, the speech decoder may provide output indices as discussed for every time instance. For evaluation or non-skip frames, the subset of distance values associated with the output indices may be determined as discussed (e.g., the neural network may be fully evaluated through the final hidden layer and only those output nodes associated with the output indices may be evaluated with the resultant distance values provided to the speech decoder). Furthermore, the subset of distance values and resultant values from the final hidden layer may be saved in memory for subsequent usage as is discussed below. For skip frames, the subset of distance values associated with the output indices may be approximated using extrapolation techniques, for example. Such techniques may require, for a particular distance value to be approximated, associated (e.g., from the same output layer node) distance values from prior frame(s). In some examples, such distance values from prior frame(s) may have been previously requested by the speech decoder, determined via the neural network, and saved to memory as discussed.

In other examples, such distance values from prior frame(s) may not have been previously determined via the neural network. In such examples, the saved final hidden layer values may be used via the neural network to re-evaluate the nodes of the output layer of the neural network for the needed prior frame(s) distance values. For example, the needed distance values may be from a previous frame or time instance but necessary for approximating a current distance value for a current frame or time instance. The current distance value or values may then be approximated as discussed using, for example, linear extrapolation techniques or the like. Such combination of frame skipping and distances on demand techniques may eliminate evaluation of the neural network for skip frames or skip time instances and may substantially reduce the evaluation of the output layer of the neural network for evaluation frames (and subsequent re-evaluation as discussed).

The discussed distance values may be used by the speech decoder to determine a sequence of textual elements such as words or phrases or n-grams or the like. The techniques discussed herein may save computational resources, battery life for mobile device implementations, cost of ownership for cloud or remote server implementations, or the like.

Furthermore, such techniques may provide real-time implementations for speech recognition as is discussed further herein.

FIG. 1 is an illustrative diagram of an example setting 100 for providing speech recognition, arranged in accordance with at least some implementations of the present disclosure. As shown in FIG. 1, setting 100 may include a user 101 providing speech 103 for evaluation by device 102. For example, device 102 may provide speech recognition such that speech 103 may be translated into text or textual elements such as words, sentences, n-grams, or the like. As shown, in some examples, a speech recognition system may be implemented via a device such as device 102. As illustrated, in some examples, device 102 may be a smartphone. However, device 102 may be any suitable device such as a computer, a laptop, an ultrabook, a tablet, or the like. In some examples, device 102 may be a wearable device such as a smart watch or smart glasses or the like. In other examples, speech recognition may be provided via a system remote to device 102 such as a server or servers in a cloud speech recognition system. In some examples, speech 103 may be received via a microphone 104 of device 102 (illustrated on a bottom of device 102). In other examples, speech 103 may be received as a pre-recording of speech or a speech signal or the like. Furthermore, in some examples, the textual elements may be provided to user 101 via a display 105 of device 102. In other examples, the textual elements may be saved to a memory of device 102 or to a remote cloud memory or the like. In some examples, device 102 may be described as a computing device as used herein.

Figure 2:
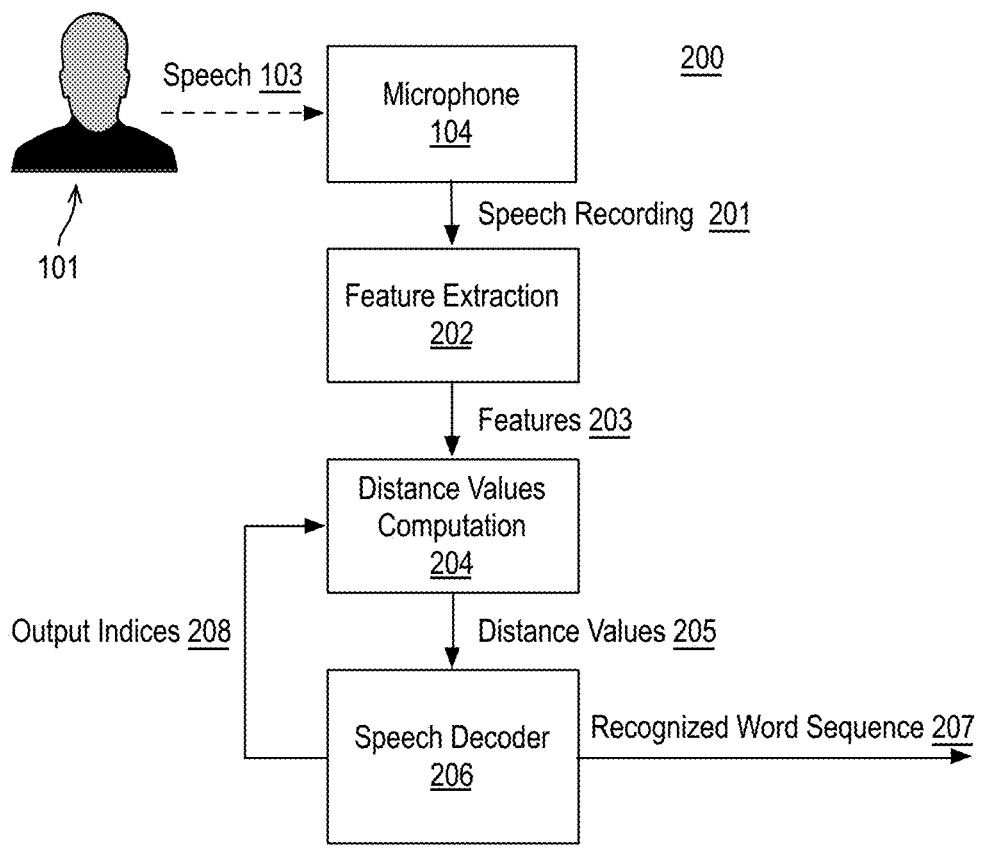
FIG. 2 is an illustrative diagram of an example system for providing speech recognition.

FIG. 2 is an illustrative diagram of an example system 200 for providing speech recognition, arranged in accordance with at least some implementations of the present disclosure. As shown in FIG. 2, system 200 may include microphone 104, a feature extraction module 202, a distance values computation module 204, and a speech decoder module 206. In some examples, speech decoder module 206 may be coupled to statistical models (not shown) implemented via memory, for example, which may be compared to distance values 205 to determine recognized word sequence 207. As shown, microphone 104 may receive speech 103 from user 101. Speech 103 may be issued by user 101 and microphone 104 may receive speech 103 (e.g., as sound waves in the air) and convert speech 103 to an electrical signal such as a digital signal to generate speech recording 201. For example, speech recording 201 may be stored in memory (not shown in FIG. 2). In other examples, speech recording 201 may be pre-recorded and speech recording 201 may be received by system 200 via another device.

Feature extraction module 202 may receive speech recording 201 from microphone 104 or from memory of system 200 and feature extraction module 202 may generate features 203 associated with speech 103. Features 203 may include any suitable features representing speech 103 and features 203 may be represented in any suitable format such as a feature vector format or the like. For example, features 203 may be coefficients representing a power spectrum of the received speech or other spectral analysis coefficients or parameters. In some examples, features 203 may be Mel frequency cepstrum coefficients (MFCCs). In some examples, feature extraction module 202 may process a speech wave signal of speech recording 201 to generate a feature vector. In examples where features 203 are represented via feature vectors, each feature vector of features 203 may be based on a time window of speech 103 (and/or speech recording 201). For example, the time window may be a certain time instance or recording duration (e.g., 10 milliseconds or the like) of speech recording 201 that slides across speech recording 201. For example, each feature vector of features 203 may thereby be determined based on an evaluation (e.g., a power spectrum analysis or the like) of the associated time window. Furthermore, in some examples, features 203 may include a stack of feature vectors (e.g., feature vectors from multiple time instances). Features 203 may include any number of features. For example, features 203 may include 200 to 260 features, 250 to 300 features, or 300 to 400 features or the like. In an embodiment, features 203 include 253 features. In another embodiment, features 203 include 256 features. As is discussed further herein, features 203 may be provided to an input layer of a neural network. Feature extraction module 202 may transfer features 203 to distance values computation module 204 and/or a memory of system 200.

Distance values computation module 204 may receive features 203 from feature extraction module 202 or from memory. Distance values computation module 204 may take as input to a neural network (e.g., either via a pre-processor, not shown, or via the neural network itself) features 203. Furthermore, in some examples, distance values computation module 204 may receive output indices via speech decoder module 206. For example, features 203 may include a stack of feature vectors that may include a current feature vector and a predetermined number of feature vectors preceding and/or succeeding the current feature vector. In an embodiment, features 203 includes a current feature vector, 5 preceding feature vectors, and 5 succeeding feature vectors for a stack of 11 feature vectors. In some examples, each feature vector includes 23 features. In examples where a stack includes 11 feature vectors each having 23 features, the number of inputs to neural network 301 may be 253 inputs (e.g., 23×11 inputs). In such examples, a neural network implemented via distance values computation module 204 may have an input layer including 253 nodes or neurons (e.g., a number of input layer nodes equal to the number of inputs to the neural network) as is discussed further herein. In some examples, such features may be provided to distance values computation module 204 at each time instance (e.g., for each time window as discussed above).

As is discussed further below, distance values computation module 204 may implement a neural network and/or a distance value approximation module to generate distance values 205. As discussed, in examples implementing distances on demand techniques, distance values computation module 204 may receive output indices 208 from speech decoder module 206 and distance values computation module 204 may provide distance values only for those associated with output indices 208. In some examples, no distances on demand is utilized and, in such examples, output indices 208 may not be implemented. Furthermore, distance values computation module 204 may implement frame skipping techniques such that at some time instances (e.g., for evaluation frames) distance values 205 are provided via a neural network and at other time instances (e.g., for skip frames) distance 205 are provided via approximation techniques based on distance values from one or more prior frame(s) evaluated via the neural network. As shown, distance values computation module 204 may transfer distance values 205 to speech decoder module 206 and/or to a memory of system 200.

Speech decoder module 206 may receive distance values 205 from distance values computation module 204 or from memory. Speech decoder module 206 may decode distance values 205 and search for a most likely textual elements and/or recognized word sequence match. For example, speech decoder module 206 may receive distance values 205 for every time instance (e.g., 10 milliseconds or the like) and deliver recognized word sequence 207 after an end of speech is detected. Speech decoder module 206 may include any suitable speech decoder. In an example, speech decoder module 206 is a Viterbi beam search decoder. As shown, in some examples, speech decoder module 206 may provide a recognized word sequence 207 as an output. Recognized word sequence 207 may be stored to a memory of system 200 and/or displayed to user 101 via display 105 or the like. In some examples, recognized word sequence 207 may be provided to another module or software application or the like for use by the module or software application. Recognized word sequence 207 or textual elements as used herein may include any suitable sequence of words, sub-word units, n-grams, syllables, letters, or the like. As shown, speech decoder module 206 may generate recognized word sequence 207 based on distance values 20). Furthermore, in distances on demand implementations, speech decoder module 206 may generate output indices 208 and provide such output indices 208 to distance values computation module 204. For example, output indices 208 may indicate a subset (e.g., one or more) of available distance values (e.g., available via distance values computation module 204) needed at a particular time instance. For example, speech decoder module 206 may not need all available distance values at each time instance in various embodiments.

As shown in FIG. 2, in some examples, distance values computation module 204 may be implemented as part of a speech recognition system. However, distance values computation module 204 may be implemented in any suitable system such as perceptual computing systems, machine learning systems, cognitive computing systems, image processing systems, or optical character recognition systems or the like. Furthermore, a neural network of distance values computation module 204 may be pre-trained based on training sets or the like prior to implementation via system 200 to determine weights and/or biases of the neural network. In some examples, pre-training may be implemented via system 200 itself. In other examples, such pre-training or other pre-implementation steps may performed by a separate system.

Figure 3:
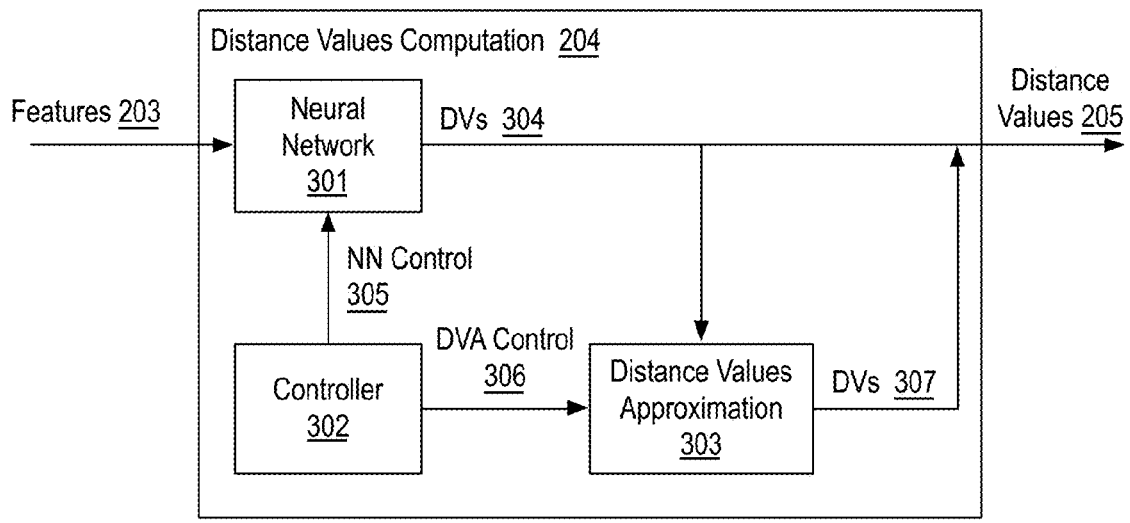
FIG. 3 is an illustrative diagram of an example distance values computation module.

FIG. 3 is an illustrative diagram of example distance values computation module 204, arranged in accordance with at least some implementations of the present disclosure. As shown, distance values computation module 204 may include a neural network 301, a controller 302, and a distance values approximation module 303. In the embodiment of FIG. 3, distance values computation module 204 may implement frame skipping with distance value approximation but not distances on demand techniques and therefore, no output indices may be received via distance values computation module 204. As shown, distance values computation module 204 may receive features 203 via neural network 301. Neural network 301 may include any suitable neural network such as a deep neural network or the like.

Figure 4:
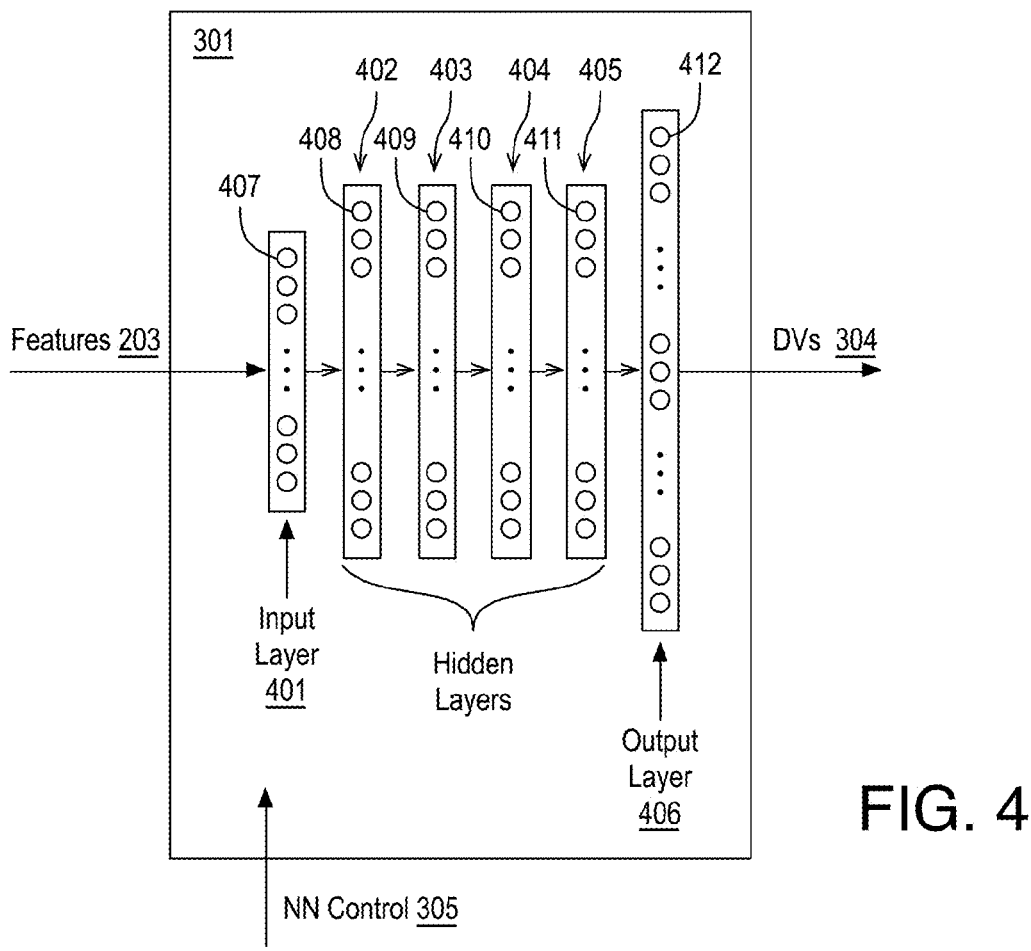
FIG. 4 is an illustrative diagram of an example neural network.

FIG. 4 is an illustrative diagram of example neural network 301, arranged in accordance with at least some implementations of the present disclosure. As shown, neural network 301 may include an input layer 401, hidden layers 402, 403, 404, 405, and output layer 406. Furthermore, hidden layer 405 may be characterized as a final hidden layer as it is adjacent to output layer 406. Also as shown, input layer 401 may include input layer nodes 407. As discussed, input layer 401 may include any number of input layer nodes 407. For example, input layer 401 may include a number of nodes equal to the number of elements features 203. For example, input layer 401 may have 253 or 256 or the like input layer nodes 407.

Furthermore, as in the illustrated example, neural network 301 includes four hidden layers 402-405. However, in other examples, neural network may include three, five, six, or more hidden layers. Hidden layers 402-405 may include any number of hidden layer nodes 408, 409, 410, 411. For example, hidden layers 402-405 may each include 100 to 200 nodes, 200 to 300 nodes, or the like. In an embodiment, neural network 301 includes four hidden layers 402-405 each having 192 nodes. In some examples, hidden layers 402-405 each have the same number of nodes and, in other examples, one or more of hidden layers 402-405 may have different numbers of nodes.

Output layer 406 may include any suitable number of output layer nodes 412 such that distance values (DVs) 205 include values for comparison and/or search to determine textual elements or recognized word sequences or the like. For example, output layer 406 may include 400 to 800 nodes, 800 to 1,500 nodes, or 1,500 to 2,500 nodes or more. In an embodiment, output layer 406 includes 512 output layer nodes 412. In an embodiment, output layer 406 includes 1,015 output layer nodes 412. In the illustrated example, data flows from the left to the right from input layer 401, through hidden layers 402-405, and through output layer 406 as shown such that the output of input layer 401 is the input to hidden layer 402, the output of hidden layer 402 is the input to hidden layer 403 and so on, and such that the output of output layer 405 is the output of neural network 301 (e.g., distance values 205). In some examples, every node in a layer may be connected to every node in the adjacent layer (e.g., the layers may be fully connected). In an example, a layer with h nodes may be connected to its neighbor layer with hh nodes through h×hh weights. In an example, input layer 401 has 253 input layer nodes 407, hidden layers 402-405 each have 192 hidden layer nodes 408-411, output layer 406 has 1,105 output layer nodes 412, and neural network 301 has about 354,000 weights. For example, every input layer node 407 of input layer 401 may be connected to every hidden layer node 408 of hidden layer 402, every hidden layer node 408 of hidden layer 402 may be connected to every hidden layer node 409 of hidden layer 403, and so on. In other examples, some connections between nodes may not be made.

Evaluation (e.g., computation) of neural network 301 may include any suitable technique or techniques. For example, input layer nodes 407 of input layer 401 may be calculated based on features 203, weights associated with each feature of features 203, and/or activation functions for each of input layer nodes 407. In an example, each of input layer nodes 407 may be determined by generating a weighted sum of products of features 203 and their associated weights (e.g., weights for different features may be different) and applying an activation function to the weighted sum. Hidden layer nodes 408 may be determined based on input layer nodes 407, weights associated with each of input layer nodes 407 (e.g., weights between different connections of input layer nodes 407 and hidden layer nodes 408 may be different), biases for each of hidden layer nodes 408, and/or activation functions for each of hidden layer nodes 408. In an example, each of hidden layer nodes 408 are determined by generating a weighted sum of products of input layer nodes 407 and associated weights, applying a bias to the weighted sum, and applying an activation function to the biased weighted sum. Hidden layer nodes 409, 410, 411 may be determined similarly to hidden layer nodes but using the preceding layer as inputs to the respective hidden layer. Furthermore, output layer nodes may be determined based on final hidden layer nodes 411, weights associated with each of final hidden layer nodes 411 (e.g., the weights may be different), and/or biases for each of output layer nodes 412. In an example, each of output layer nodes 412 are determined by generating a weighted sum of products of final hidden layer nodes 411 and associated weights and applying a bias to the weighted sum. As discussed, other techniques may be used to evaluate nodes of neural network 301 and the techniques discussed herein are not limited to any neural network evaluation technique or techniques.

In some examples, neural network 301 may be implemented for speech recognition in a test or implementation phase after neural network 301 has been trained in a training phase. Such a training phase may determine weights for nodes of neural network 301, biases for nodes of neural network 301, and the like. In some examples, during cross-entropy training (e.g., during the training phase) of neural network 301, output layer 406 may have a softmax activation function that may be omitted during the implementation or test phase. In some examples, during implementation, outputs from output layer 406 may be scaled based on class probabilities prior to being provided as distance values 304.

Also as shown in FIG. 4, neural network 301 may be operated under control of controller 302 via neural network (NN) control signal 305. For example, in frame skipping implementations as discussed, neural network control signal 305 may control whether or not neural network 301 is evaluated at a particular time instance. For example, for evaluation frames, neural network control signal 305 may signal for evaluation of neural network 301 and, for skip frames, neural network control signal 305 may signal for no evaluation of neural network 301.

Returning to FIG. 3, as discussed, for evaluation frames or time instances, controller 302 may provide neural network 301 neural network control signal 305 for evaluation of neural network 301. At such time instances or for such frames, neural network 301 may generate distance values 304 based on features 203 and other characteristics (e.g., weights, biases, activation functions, and the like) of neural network 301 to generate distance values 304, which, as shown, may be provided for such evaluation frames or time instances as distance values 205. During such evaluation frames or time instances, controller 302 may also signal to distance value approximation module 303 for no approximations to be made. As shown, distance values 304 may also be provided to distance value approximation 303 for use in subsequent time instances.

For skip frames, controller 302 may provide neural network control signal 305 indicating no evaluation of neural network 301. Furthermore, controller 302 may provide distance values approximation module 303 an indication that distance values 307 are to be generated via distance values approximation control signal 306 for such a skip frame or time instance associated with a skip frame. For example, at such time instances, neural network 301 may not be evaluated (e.g. it may be off) saving substantial computing resources. Furthermore, at such time instances, distance values 205 may be provided as approximated distance values 307.

For example, features 203 may be highly correlated over time and, as a result, consecutive feature vectors of features 203 may be substantially similar. Furthermore, if fully evaluated for such features, neural network 301 would provide substantially similar or correlated distance values over time. Such similarities over time may be utilized to avoid evaluating neural network 301 at each time instance as discussed herein (e.g., such that frame skipping may be implemented). For example, neural network 301 may be evaluated for every $N^{th}$ frame instead of every frame where N=2, 3, 4, or more and distance values from previously evaluated time instances (e.g., evaluation frames) may be used to approximate distance values for such skip frames.

Figure 5:
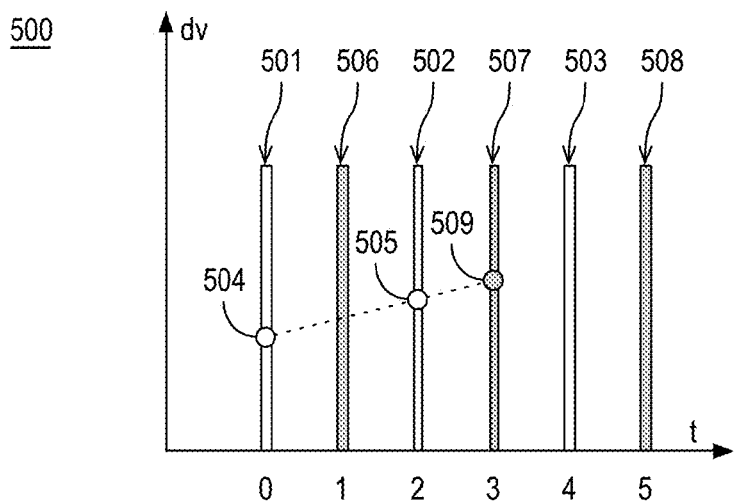
FIG. 5 illustrates an example timeline of evaluation and skip frames.

FIG. 5 illustrates an example timeline 500 of evaluation and skip frames, arranged in accordance with at least some implementations of the present disclosure. In FIG. 5, the x-axis of timeline 500 illustrates increasing time over example time instances 0, 1, 2, 3, 4, and 5. As shown, at time instances 0, 2, 4, evaluation frames 501, 502, 503 may be generated via a neural network such as neural network 301. Furthermore, FIG. 5 illustrates example neural network determined distance values 504, 505. For example, neural network determined distance values 504, 505 may both be associated with an output node of output layer nodes 412. For example, distance value 504 may be the output of the node at time t=0 and distance value 505 may be the output of the node at time t=2. FIG. 5 also illustrates approximated (e.g., skip) frames 506, 507, 508. For example, at time instances 1, 3, 5, approximated frames 506, 507, 508 may be generated via distance values approximation module 303 based on neural network determined distance values for previous evaluation frames 501, 502, 503. For example, FIG. 5 illustrates approximated distance value 509 determined based on neural network determined distance values 504, 505.

Approximated distance value 509 may be determined using any suitable approximation technique or techniques. Approximated distance value 509 may be associated with the same output node of output layer nodes 412 (e.g., although approximated distance value 509 is approximated and not an output of neural network 301). In the illustrated example, approximated distance value 509 is determined based on an extrapolation using two previous neural network determined distance values 504, 505. For example, approximated distance value 509 may be extrapolated based on previous neural network determined distance values 504, 505 and, as shown, the time instance for previous neural network determined distance values 505 may be before the time instance for approximated distance value 509 and the time instance for previous neural network determined distance values 504 may be before the time instance for previous neural network determined distance values 505. In other examples, approximated distance value 509 may be determined using only one previous neural network determined distance value (e.g., previous neural network determined distance value 505). In yet other examples, approximated distance value 509 may be determined using only three or more previous neural network determined distance values. Although illustrated and discussed with respect to extrapolation techniques, approximated distance value 509 may be determined using interpolation techniques (e.g., based on previous neural network determined distance value 505 and an analogous subsequent neural network determined distance value from subsequent evaluation frame 503).

In some examples, approximated distance value 509 may be determined using a linear extrapolation technique. For example, approximated distance value 509 may be determined based on adding previous neural network determined distance value 505 to half of a difference between previous neural network determined distance value 505 and previous neural network determined distance value 504. In some examples, approximated distance value 509 may be determined as shown in Equation (1):

$$o(3) = o(2) + 0.5 \times (o(2) - o(0)) \quad (1)$$

where o(3) may be the approximated distance value 509, o(2) may be previous neural network determined distance value 505, and o(0) may be previous neural network determined distance value 504.

As shown in FIG. 5, in some examples, every other frame may be an approximated or skip frame (e.g., every $N^{th}$ frame such that N=2). For example, such frame skipping may be implemented via a modulo operation where N=2 and if the time instance modulo 2 is zero, the frame is an evaluation frame. In other examples, every third frame (e.g., N=3), every fourth frame (e.g., N=4), or every fifth frame (e.g., N=5), or the like may be an approximated or skip frame. In yet other examples, a skipping pattern may be heuristically determined such that the number of skipped frames is increased or decreased based on the accuracy needs of speech decoder system 206 or the like. For example, controller 302 may determine a skipping pattern or frame skipping rate based on one or more of accuracy needs of speech decoder system 206, available computing resources of speech decoder system 206, or a current real time factor. For example, the real time factor may measure the speed of speech decoder system 206 (e.g., if it takes time P to process an input of duration I, the real time factor, RTF, may be defined as P/I). In some examples, the frame skipping rate may be dynamically determined or adjusted based on accuracy needs of speech decoder system 206, available computing resources of speech decoder system 206, or a current real time factor, or the like. For example, if greater accuracy is needed the frame skipping rate may be reduced, if computing resources are not available the frame skipping rate may be increased, or if the current real time factor is too high or increasing the frame skipping rate may be increased. In some examples, all three factors and/or additional factors may be used to determine the frame skipping rate via controller 302 or another module of system 200. The frame skipping rate may be implemented via controller 302 to control neural network 301 and distances value approximation module 303 as discussed herein. For example, increasing the frame skipping rate may include providing one or more additional skip frames between an evaluation frame and a skip frame and reducing the frame skipping rate may include removing one or more additional skip frames from between an evaluation frame and a skip frame.

Furthermore, as discussed, a linear extrapolation may be used to determine approximated distance value 509. In other examples, an extrapolation may be performed based on a non-linear function or a variance function or the like. In some examples, all distance values of an approximation frame may be determined using the same approximation technique (e.g., linear extrapolation) and, in other examples, distance values of an approximation frame may be determined using different approximation techniques (e.g., some linear, some non-linear). Furthermore, FIG. 5 illustrates t=1 frame 506 as an approximated frame. For example, frame 506 may have for reference only previous evaluation frame 501 and as such, frame 506 may be approximated as equal to previous evaluation frames 501. In other examples, t=1 frame 506 may be determined via an evaluation of neural network 301. As discussed elsewhere herein, evaluation frames 501, 502, 503 may be saved in memory for retrieval and generation of approximated frames 506, 507, 508. Furthermore, such extrapolation techniques including linear extrapolation techniques may be processed in runtime for real-time speech recognition results.

Figure 6:
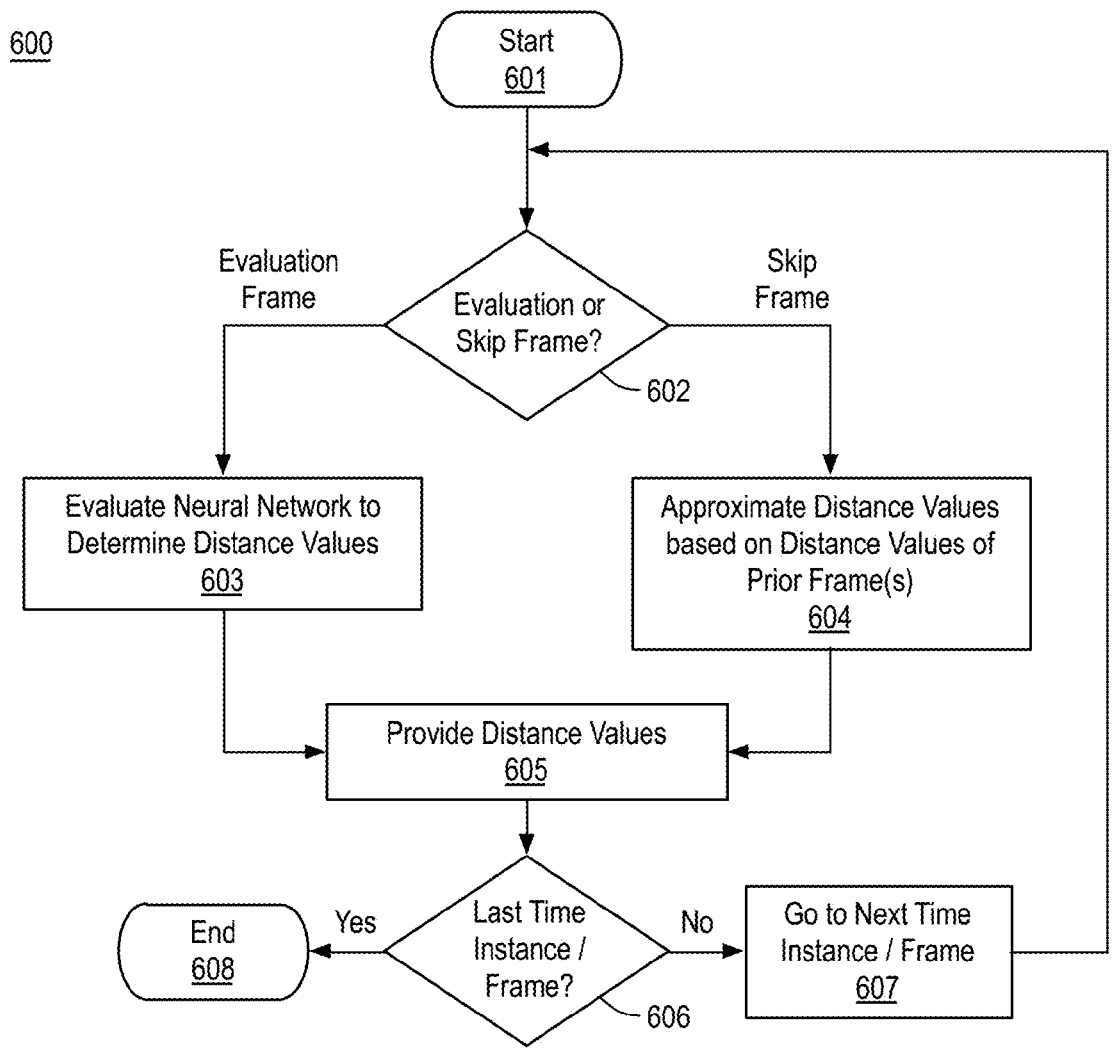
FIG. 6 is a flow diagram illustrating an example process for determining distance values using frame skipping and distance value approximation.

FIG. 6 is a flow diagram illustrating an example process 600 for determining distance values using frame skipping and distance value approximation, arranged in accordance with at least some implementations of the present disclosure. Process 600 may include one or more operations 601-608 as illustrated in FIG. 6. Process 600 may be performed by a device such as device 102 or a remote server or the like. Process 600 may be used to determine and provide distance values for use by speech decoder as discussed herein. For example, process 600 may be implemented by controller 302, neural network 301, and distance values approximation module 303.

As shown, process 600 may begin at starting operation 601 and process 600 may continue at decision operation 602, "Evaluation or Skip Frame", where a determination may be made as to whether the current frame is an evaluation frame or a skip frame. For example, controller 302 may determine whether the current frame is an evaluation frame or a skip frame. As shown, if the current frame is an evaluation frame, process 600 may continue at operation 603, "Evaluate Neural Network to Determine Distance Values", where the distance values may be determined for the current frame based on an evaluation of a neural network. For example, distance values 304 may be determined by neural network 301 as implemented via distance values computation module 204 at operation 603.

If the current frame is a skip frame, process 600 may continue at operation 604, "Approximate Distance Values based on Distance Values of Prior Frame(s)", where distance values may be approximated based on distance values of prior neural network calculated frames. For example, distance values may be approximated using linear extrapolation as discussed herein. In an example, distance values 307 may be determined by distance value approximation module 303 as implemented via distance values computation module 204 at operation 604.

As shown, in either the case of an evaluation frame or a skip frame, process 600 may continue at operation 605, "Provide Distance Values", where distance values may be provided to a speech decoder for the determination of a sequence of textual elements as discussed herein. For example, distance values computation module 204 may provide distance values 205 (e.g., including distance values 304 or distance values 307 depending on the frame type) to speech decoder module 206 for the generation of recognized word sequence 207.

Process 600 may continue at decision operation 606, "Last Time Instance/Frame?", where a determination may be made as to whether the current frame is a last frame. If the current frame is not the last frame, process 600 may continue at operation 607, "Go to Next Time Instance/Frame", where process 600 may continue at a next time instance for next frame at decision operation 602 as shown. If the current frame is the last frame, process 600 may end at ending operation 608.

As discussed, distance values computation module 204 including neural network 301, controller 302, and distance values approximation module 303 may implement frame skipping to substantially reduce computational loads in automatic speech recognition implementations. Such implementations may offer fast and accurate speech recognition results in various computing environments. For example, such frame skipping techniques may provide for a 50% or more reduction in computation cost with no loss of accuracy. Furthermore, tradeoffs between speed and accuracy may be made either by setting the number of skip frames prior to runtime or during runtime by adjusting the number of skip frames during processing. Furthermore, in contrast to prior frame skipping or multi-frame neural network implementations, the described frame skipping techniques do not require adjustment or optimization of the neural network prior to implementation or additional specifically trained knowledge sources (e.g., to train the neural network). Table 1 illustrates example results of the described frame skipping techniques.

TABLE 1

Comparison of Increase in Word Error Rates

| Method | N = 1 | N = 2 | N = 3 | N = 4 |
|---|---|---|---|---|
| | Increase in Word Error Rates [%] | | | |
| Prior Frame Skipping Techniques | 0 | 2 | 4 | 8 |
| Frame Skipping with Distance Value Approximation | 0 | 0 | 0 | 4 |

Table 1 provides results using the same speech recognition engine for all testing. The reported results represent the mean of six recognition experiments based on about 25,000 total spoken utterances in total. In the results of Table 1, frame skipping with distance value approximation is based on linear extrapolation based on two prior neural network distances as discussed with respect to Equation (1). As shown, for prior frame skipping techniques, the word error rate steadily increase from a baseline (e.g., with no skipping at N=1) to 8% with frame skipping at N=4. With the discussed techniques, there is no increase in error rate with frame skipping at N=2 and N=3. For N=4, the increase in word error rate using distance value approximation using linear extrapolation is 4%, which is half of the increase based on prior frame skipping techniques. For example, at N=3, an automatic speech recognition system using the discussed frame skipping with distance value approximation techniques may reduce computational costs by more than 50% without a loss in accuracy. For example, the neural network may contribute as much as 70% to the overall footprint of the automatic speech recognition system and such reduction of the use of the neural network may reduce the computation footprint of the automatic speech recognition system significantly.

Furthermore, Pseudo-code (1) provides an example process for providing frame skipping with linear approximation.

```
Pseudo-code (1):
Integer N; // modulo
Integer t; // time frame
Integer m; // modulo rest
Integer s; // frame index of last computed frame
Integer p; // frame index of computed frame before frame s
Float fac;
FloatVector feature_vectors[];
FloatVector o[]; // matrix with outputs
FloatVector delta;
for ( t=0; t<T; t++) { // loop over time frames t from 0 to T-1
  m = t % N; // modulo residual
  if ( m == 0 ) { // a non-skipped frame
    o(t) = compute_DNN( feature_vectors(t) );
  } else {
    s = ( t / N ) * N; // index of last computed frame
    p = s - N; // index of computed frame before frame s
    fac = (float)m / (float)N;
    if (p < 0) {
```

-continued

```
      fac = 0.0; // skip these
      p = 0; // value does not matter
    }
    delta = o(s) - o(p); // delta vector
    o(t) = o(s) + fac * delta;
  }
}
```

As shown in Pseudo-code (1), for non-skipped frames (e.g., evaluation frames), the modulo of the time frame (e.g., time instance or frame) and a skip rate (e.g., N value) may be 0 and for such time frames, the distance values (e.g., outputs) may be determined by evaluating the neural network (e.g., compute_DNN). For skip frames, the module of the time frame and skip rate may be non-zero and the indices of the previous evaluation frames may be determined (e.g., via s and p in Pseduo-code (1)). The distance values for the skip frame may then be determined based on the previously determined neural network outputs by applying a factor (e.g., fac) to a delta between the previously determined neural network outputs and adding the delta to the most recent previously determined neural network output. For example, the factor may be based on the skip frame location relative to the prior neural network computed frames. In the example of Equation (1) with N=1, the factor may be 0.5 for example as the modulo (e.g., m) is one and the skip rate (e.g. N) is two. In examples with more skip frames between evaluation frames, the factor may vary depending on how recent the evaluation frame is to the skip frame. For example, if N=3 and the skip frame is immediately following an evaluation frame the factor may be ⅓ and if the skip frame is a second skip frame after an evaluation frame, the factor may be ⅔ for example.

As discussed, distance values computation module 204 including neural network 301, controller 302, and distance values approximation module 303 may implement frame skipping to substantially reduce computational loads in automatic speech recognition implementations. In other embodiments, such frame skipping techniques may be combined with distances on demand techniques.

Figure 7:
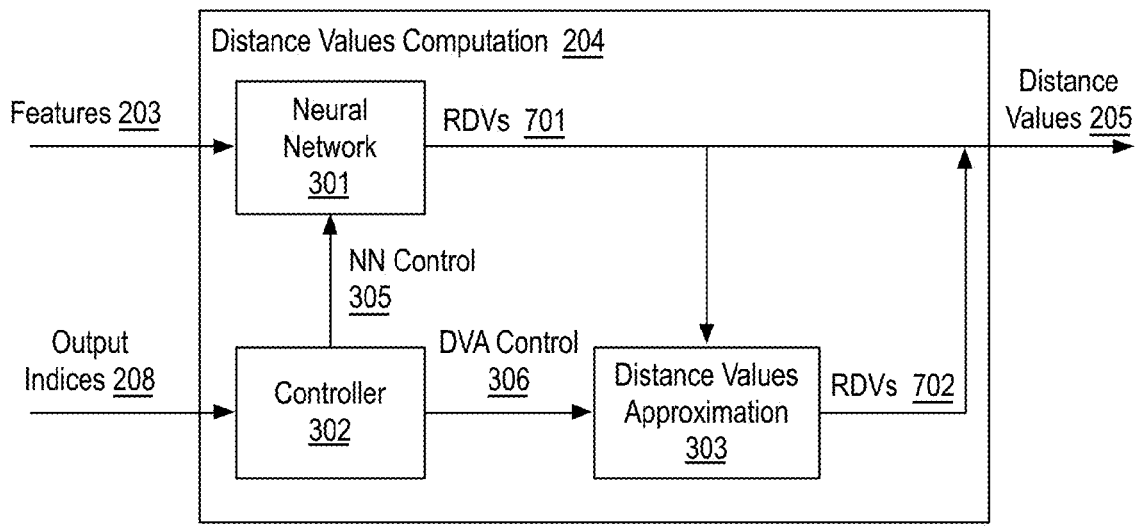
FIG. 7 is an illustrative diagram of an example distance values computation module.

FIG. 7 is an illustrative diagram of example distance values computation module 204, arranged in accordance with at least some implementations of the present disclosure. As discussed, distance values computation module 204 may include neural network 301, controller 302, and distance values approximation module 303. In the embodiment of FIG. 7, distance values computation module 204 may implement frame skipping with distance value approximation and distances on demand techniques. For example, distance values computation module 204 may receive output indices 208 from speech decoder module 206 (please refer to FIG. 2). In such examples, distance values computation module 204 and speech decoder module 206 may be bi-directionally coupled. Such output indices 208 may include indicators of which distance values (e.g., outputs) speech decoder module 206 is requesting at a particular time instance (or for a particular frame or the like). Output indices 208 may include any suitable indicators such as indicators associated with output layer nodes 412 and/or a time stamp indicating the time instance for the request. As shown, distance values computation module 204 may receive features 203 via neural network 301 and output indices 208 via controller 302. Neural network 301 may include any suitable neural network such as a deep neural network or the like. For example, neural network 301 may include any neural network as discussed herein.

Figure 8:
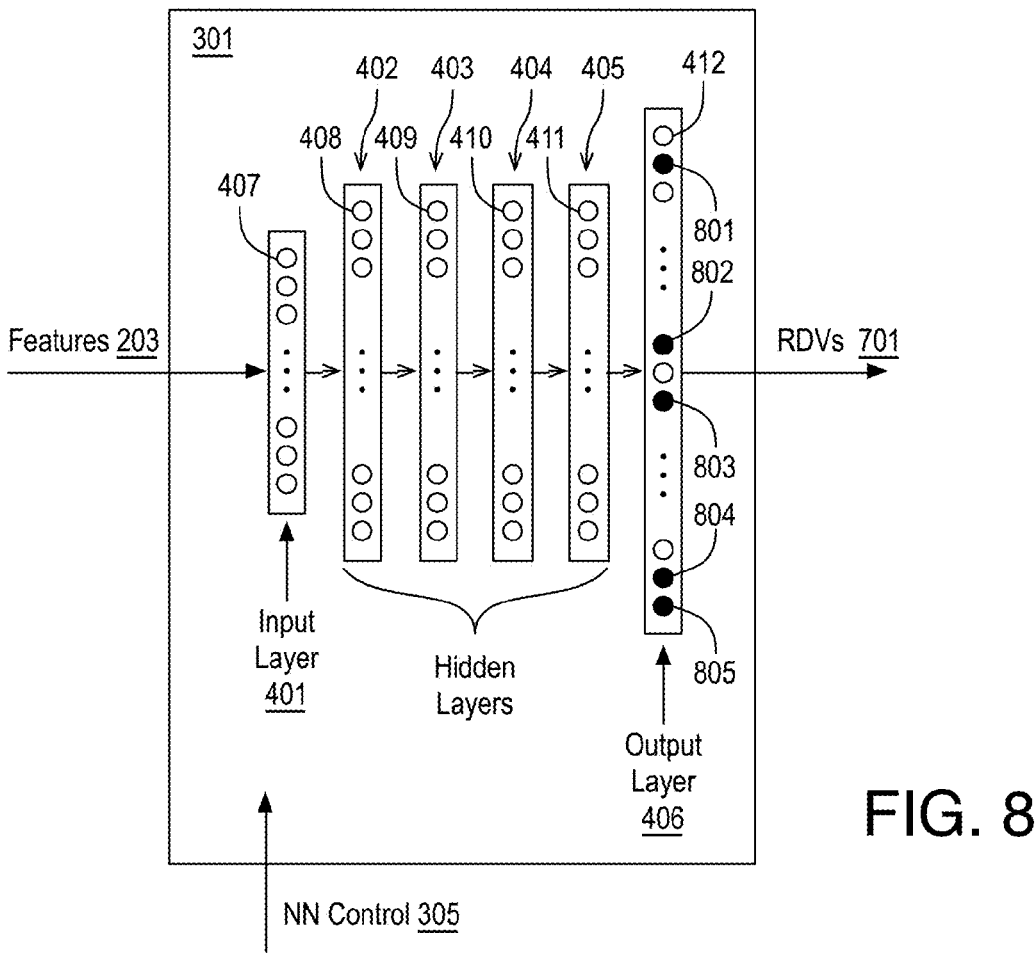
FIG. 8 is an illustrative diagram of an example neural network.

FIG. 8 is an illustrative diagram of example neural network 301, arranged in accordance with at least some implementations of the present disclosure. As shown, neural network 301 may include input layer 401, hidden layers 402, 403, 404, 405, and output layer 406. Furthermore, as discussed, hidden layer 405 may be characterized as a final hidden layer as it is adjacent to output layer 406. Also as shown, input layer 401 may include input layer nodes 407, hidden layers 402, 403, 404 may include hidden layer nodes 408, 409, 410, respectively, and final hidden layer 405 may include final hidden layer nodes 411. Also, output layer 406 may include output layer nodes 412. The characteristics of neural network 301 were discussed with respect to FIG. 4 and will not be repeated for the sake of brevity.

Returning to FIG. 7, controller 302 may receive output indices 208. Controller 302 may also determine whether a current time instance is associated with an evaluation frame or a skip frame. If the current time instance is associated with an evaluation frame (e.g., such that distance values are to be determined based on an evaluation of neural network 301), controller 302 may provide neural network (NN) control signal 305 to neural network 301. Neural network control signal 305 may indicate the neural network is to be evaluated at the current time instance and the output nodes for which distance values are requested. For example, output indices 208 may indicate a subset of all available distance values and the neural network may only be requested to provide such distance values.

In such evaluation frame examples, neural network 301 may evaluate all layers of the network through final hidden layer 405. For example, to evaluate even one output node of output layer nodes 412, all layers through final hidden layer 405 may need to be evaluated. Returning to FIG. 8, as shown, in such examples, neural network 301 may evaluate all of input layer nodes 407, hidden layer nodes, 408, 409, 410, and final hidden layer nodes 411. The final hidden layer values determined via final hidden layer nodes 411 may be saved in memory for future use as is discussed further herein with respect to skip frame examples. Furthermore, neural network 301 may evaluate only those output layer nodes 412 that are requested (e.g., via output indices 208). Output layer 406 may also include non-evaluated output layer nodes 801-805 such that non-evaluated output layer nodes 801-805 (e.g., those that are blacked out in FIG. 8) are not calculated and only requested output layer nodes 412 (e.g., those that are in white) are calculated.

Returning to FIG. 7, neural network 301 may provide the distance values requested via controller 302 as requested distance values (RDVs) 701, which may be provided via distance values computation module 204 as a portion of distance values 205 to speech decoder module 206 (please refer to FIG. 2).

As discussed, if the current frame is an evaluation frame, neural network 301 may be implemented to determine requested distance values 701. If instead the current frame (or a subsequent frame) is a skip frame, controller 302 may provide distance values approximation control signal 306 to distance values approximation module 303 requesting approximation of the distance values requested via output indices 208. However, as discussed herein, distance values approximation module 303 may generate approximated distance values based on previous distance values calculated via neural network 301. Furthermore, as discussed with respect to the evaluation frame example, only a subset of neural network output layer nodes may be evaluated and only the corresponding subset of neural network determined distance values may be available. If the skip frame requested output indices 208 correspond to distance values determined at a previous evaluation frame, distance values approximation module 303 may use such previously determined distance values to generate requested distance values 702 via approximation techniques as discussed herein.

However, if such previously determined distance values (e.g., via neural network 301) are not available (e.g., they were not previously calculated and saved via memory), controller 302 may provide, via neural network control signal 305, a request to neural network 301 to determine the needed distance values for the previous frame. For example, neural network 301 may load saved final hidden layer values for the previous evaluation frame and evaluate the newly requested nodes of output layer 406. For example, referring to FIG. 8, a distance value associated with previously non-requested output layer node 804 may now be needed to approximate a distance value for a (current) skip frame. Neural network 301 may evaluate the requested node and provide the requested distance value 701 to distance values approximation module 303 as shown in FIG. 7. Such a process may be repeated for any number of needed neural network determined distance values and for any number of previous evaluation frames (e.g., typically two previous evaluation frames).

Returning to FIG. 7, distance values approximation module 303, now with the needed neural network determined distance values, may generate requested distance values 702 for the current skip frame. For example, distance values approximation module 303 may determine such requested distance values 702 using extrapolation or interpolation techniques based on linear, non-linear, or variance functions as described herein. Distance values approximation module 303 may determine such requested distance values 702 using any techniques or characteristics discussed herein and such techniques or characteristics will not be repeated for the sake of brevity.

Referring to FIG. 2, speech decoder module 206 may receive such (requested) distance values 205 and may continue to decode and/or search for recognized word sequences. Furthermore, speech decoder module 206 may generate, for a next time frame, output indices 208, which may indicate distance values 205 that speech decoder needs for the next frame to continue the described decoding/searching. For example, speech decoder module 206 may be a Viterbi beam searching or pruning speech decoder that may limit the number or inventory of hypotheses being evaluated such that a subset of available distance values may be used to effectively search for recognized word sequence 207 or a portion thereof.

Figure 9:
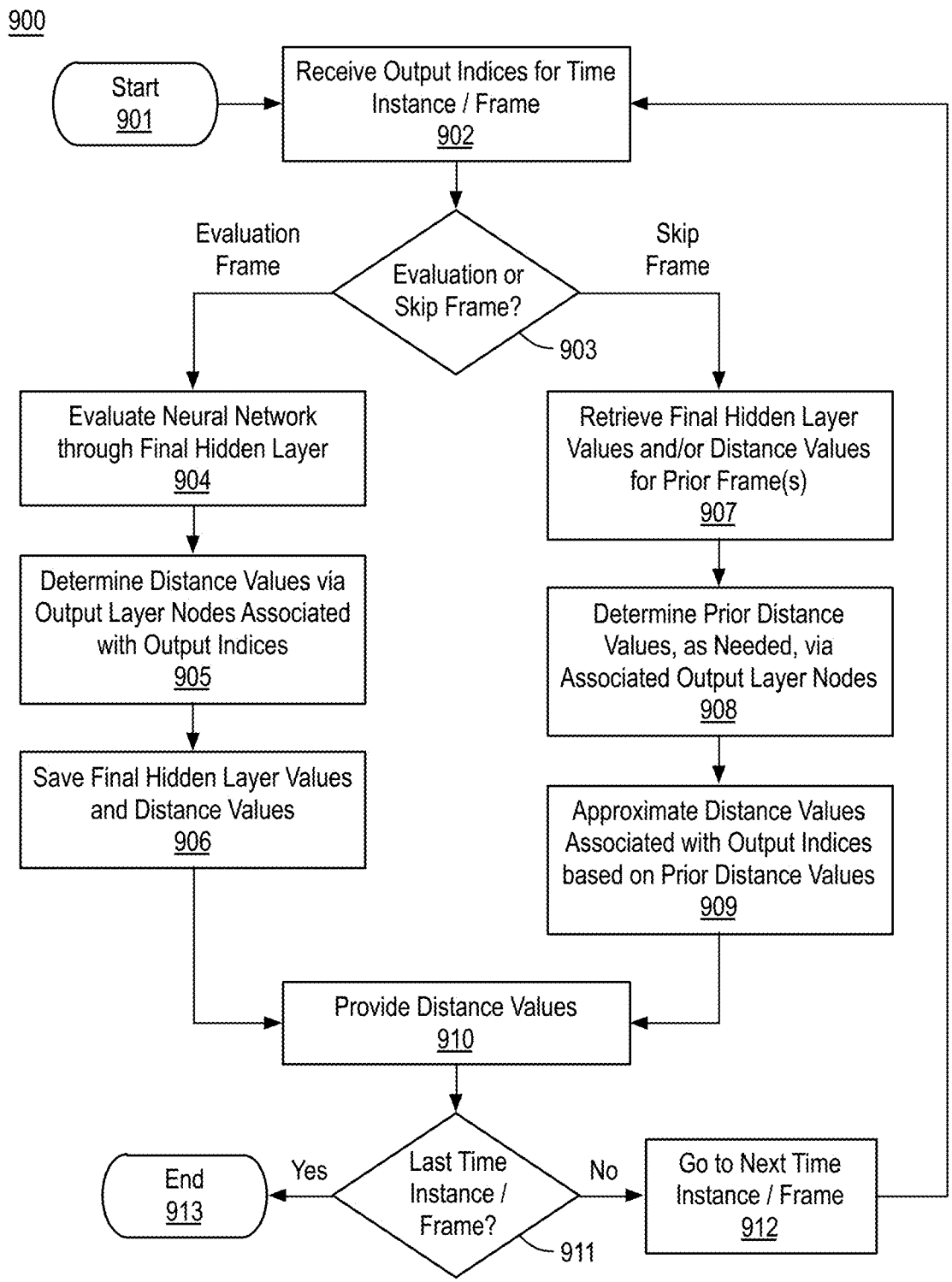
FIG. 9 is a flow diagram illustrating an example process for determining distance values using frame skipping, distances on demand, and distance value approximation.

FIG. 9 is a flow diagram illustrating an example process 900 for determining distance values using frame skipping, distances on demand, and distance value approximation, arranged in accordance with at least some implementations of the present disclosure. Process 900 may include one or more operations 901-913 as illustrated in FIG. 9. Process 900 may be performed by a device such as device 102 or a remote server or the like. Process 900 may be used to determine and provide distance values for use by speech decoder as discussed herein. For example, process 900 may be implemented by controller 302, neural network 301, and distance values approximation module 303.

As shown, process 900 may begin at starting operation 901 and process 900 may continue at operation 902, "Receive Output Indices for Time Instance/Frame", where output indices may be received for a current time instance or frame. For example, speech decoder module 206 may generate output indices 208, which may be provided to and received by distance values computation module 204. Process 900 may continue at decision operation 903, "Evaluation or Skip Frame", where a determination may be made as to whether the current frame is an evaluation frame or a skip frame. For example, controller 302 may determine whether the current frame is an evaluation frame or a skip frame based on a modulo calculation using a frame skip rate.

As shown, if the current frame is an evaluation frame, process 900 may continue at operation 904, "Evaluate Neural Network through Final Hidden Layer", where a neural network may be evaluated through a final hidden layer. For example, neural network 301 may be fully evaluated from input layer 401 through final hidden layer 405. Process 900 may continue at operation 905, "Determine Distance Values via Output Layer Nodes Associated with Output Indices", where the output layer nodes of a neural network may be evaluated to determine distance values associated with the output indices (e.g., the requested distance values). For example, using neural network 301, a subset of output layer nodes 412 of output layer 406 may be evaluated to determine the requested distance values. For example, requested distance values 701 may be determined by neural network 301 as implemented via distance values computation module 204 at operation 905. Process 900 may continue at operation 906, "Save Final Hidden Layer Values and Distance Values", where final hidden layer values associated with a final hidden layer of a neural network and the neural network determined distance values may be saved for future use. For example, final hidden layer values determined via final hidden layer nodes 411 of neural network 301 may be saved via a memory for use in the approximation of subsequent distance values as is discussed further herein. Similarly, distance values determined via the activated subset of output layer 406 may be saved for use in the approximation of subsequent distance values. Such saved final hidden layer values and neural network determined distance values may be discarded when no longer needed (e.g., when a current frame may no longer call back to such an evaluation frame for the approximation of distance values).

If the current frame is a skip frame, process 900 may continue at operation 907, "Retrieve Final Hidden Layer Values and/or Distance Values for Prior Frame(s)", where final hidden layer values and/or prior neural network determined distance values (as saved at operation 906) may be retrieved. For example, such values may be retrieved from memory via controller 302 or distance values approximation module 303. For example, if an output index of the output indices for the current frame is associated with a previously neural network determined distance value, such previously neural network determined distance value may be retrieved. If an output index value of the output indices for the current fame is associated with a neural network node that was not previously determined, the final hidden layer values may be retrieved.

Process 900 may continue at operation 908, "Determine Prior Distance Values, as Needed, via Associated Output Layer Nodes", where prior distance values may be determined for output indices via associated output layer nodes. For example, for distance values that are currently needed for approximation, but were not previously determined via a neural network, such distance values may be determined via output layer nodes of the neural network. For example, final hidden layer values retrieved at operation 907 may be used to evaluate a subset of (e.g., one or more of) output layer nodes 412 of output layer 406. In some examples, such distance values may have already been saved at operation 906 and operation 908 may be skipped.

Process 900 may continue at operation 909, "Approximate Distance Values Associated with Output Indices based on Prior Distance Values", where distance values may be approximated based on prior neural network calculated distance values. The approximated distance values may be those associated with the received output indices and the prior distance values may be saved via operation 906 or determined via operation 908 as discussed. For example, distance values may be approximated using linear extrapolation as discussed herein. In an example, requested distance values 702 may be determined by distance value approximation module 303 as implemented via distance values computation module 204 at operation 909.

As shown, in either the case of an evaluation frame or a skip frame, process 900 may continue at operation 910, "Provide Distance Values", where distance values may be provided to a speech decoder for the determination of a sequence of textual elements as discussed herein. For example, distance values computation module 204 may provide distance values 205 (e.g., including requested distance values 701 or requested distance values 702 depending on the frame type) to speech decoder module 206 for the generation of recognized word sequence 207.

Process 900 may continue at decision operation 911, "Last Time Instance/Frame?", where a determination may be made as to whether the current frame is a last frame. If the current frame is not the last frame, process 900 may continue at operation 912, "Go to Next Time Instance/Frame", where process 900 may continue at a next time instance for next frame at operation 902 as shown. If the current frame is the last frame, process 900 may end at ending operation 913.

As discussed, distance values computation module 204 including neural network 301, controller 302, and distance values approximation module 303 may implement frame skipping and distances on demand to substantially reduce computational loads in automatic speech recognition implementations. In some examples, such distances on demand techniques may be implemented without the implementation of such frame skipping techniques. For example, with reference to FIG. 7, distance values computation module 204 may be implemented without distance values approximation module 303 and, for each time instance or frame, controller 302 may control neural network to provide only those distance values (e.g., requested distance values 701) associated with output indices 208. With reference to FIG. 9, such a distances on demand process may include operations 902, 904, 905, 910, 911, 912, and 913 such that output indices may be received, a neural network may be fully evaluated through a final hidden layer, only a subset of output layer nodes corresponding to the output indices may be evaluated, and the determined distance values (e.g., the subset) may be provided to a speech decoder. Such a process may not necessitate saving the final hidden layer values or distance values for future use for example nor the implementation of the branch of operations (e.g., operations 903, 907, 908) providing for the integration of skip frame techniques.

Such frame skipping techniques may be considered approximation techniques as distance values are approximated via extrapolation or interpolation techniques as discussed. Such distances on demand techniques may be considered non-approximation techniques since the speech decoder is receiving only those distance values it needs for a current frame and (in the case of neural network determined distance values) such distance values are not approximated. Therefore, such distances on demand techniques may reduce computational costs without reducing accuracy. For example, in comparison to frame skipping only, the addition of distances on demand techniques may decrease computation by 22%. In some examples, the output layer may be about 50% of the neural network and evaluating only a requested subset of the output layer may save about 45% of the computational cost of the neural network. In various examples, evaluating only a requested subset of the output layer may save 0 to 50% of the computational cost of the neural network. Table 2 illustrates example results of the described frame skipping and distances on demand techniques.

TABLE 2

Comparison of Real Time Factor and Compute Cost

| Distances on Demand Implemented? | Frame Skipping Implemented? | Overall Real Time Factor | Neural Network Compute Cost |
|---|---|---|---|
| No | No | 2.49 | ~800 MCPS |
| Yes | No | 1.97 | ~615 MCPS |
| No | Yes | 1.18 | ~290 MCPS |
| Yes | Yes | 1.00 | ~225 MCPS |

Table 2 provides example results for a neural network having about 354,000 weights as discussed in the example having 253 input layer nodes, 4 hidden layers with 192 hidden layer nodes each, and 1,015 output layer nodes. Furthermore, the results were attained with the same speech recognition engine for all testing The number of words in the applied statistical language model was 1,000. The frame skipping rate was set to N=3 (e.g., module 3). The speech decoder was a beam width speech decoder provided with conservative settings for the best possible speech recognition performance. As shown, the overall (e.g., feature extraction, neural network and/or value approximation module, and speech decoder) system performance provided a real time factor (RTF) for brute force neural network computation (e.g., no frame skipping nor distances on demand) of 2.49 seconds to process 1 second of speech with a compute cost (e.g., the required number of central processing unit (CPU) cycles per second for the system to run in real time) of about 800 MPCS (mega cycles per second). Distances on demand alone reduced the real time factor by about 22% and frame skipping alone reduced the real time factor by about 64%. Applying distances on demand on top of frame skipping provided an additional reduction of about 22% and brought the overall system to a real time factor or 1.00. In the given example, the combination of frame skipping and distances on demand with linear extrapolation allows an automated speech recognition system to run in real time without loss of accuracy.

Furthermore, Pseudo-code (2) provides an example process for providing frame skipping with linear approximation combined with distances on demand.

```
// l(t) nodes values of the uppermost hidden layer, filled for (t%N)==0
// d output index
// t time frame
// DNN structure containing the DNN
getOutput(d, t, l, DNN)
{
  m = t % N;
  if ( m==0) {
    if ( undefined o(t, d) ) o(t, d) = compute_output(DNN, l(t), d);
    return( o(t, d) );
  } // implicit else : a skipped frame
  s = ( t / N) * N; // index of last computed frame
  p = s - N; // index of computed frame before frame s
  if (p<0) p = 0;
  if ( undefined o(s, d) ) o(s, d) = compute_output(DNN, l(s), d);
  if ( undefined o(p, d) ) o(p, d) = compute_output(DNN, l(p), d);
  return( linear_extrapolate(N, m, o(s, d), o(p, d) ) );
}
```

As shown in Pseudo-code (1), for non-skipped frames (e.g., evaluation frames), the modulo may be 0 and requested distance values may be computed via the neural network (e.g., DNN). For skipped frames, prior needed distance values may be computed via the neural network and used for approximation via extrapolation (e.g., linear_extrapolate) of the current distance value.

As discussed, distance values computation module 204 including neural network 301, controller 302, and distance values approximation module 303 may implement frame skipping and/or distances on demand to substantially reduce computational loads in automatic speech recognition implementations with no or little reduction in speech recognition accuracy. Furthermore, such distance values computation module 204 including neural network 301, controller 302, and distance values approximation module 303 may be implemented via the same processing device (e.g., a central processing unit, graphics processing unit, signal processor, or the like) or various portions of the neural network may be implemented via different processing devices.

Figures 10, 11:
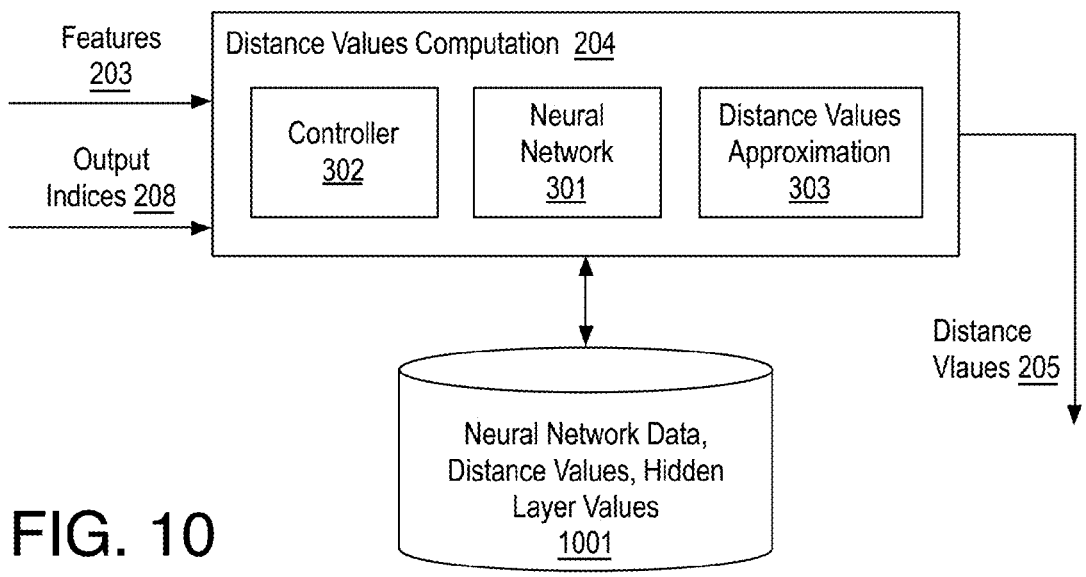
FIG. 10 is an illustrative diagram of an example system for implementing frame skipping and/or distances on demand.
FIG. 11 is a flow diagram illustrating an example process for providing automatic speech recognition.

FIG. 10 is an illustrative diagram of an example system 1000 for implementing frame skipping and/or distances on demand for generating distance values 205 from features 203 and output indices 208, arranged in accordance with at least some implementations of the present disclosure. As shown in FIG. 10, system 1000 may include distance values computation module 204 having neural network 301, controller 302, and distance values approximation module 303 and memory stores 1001 configured to store neural network data, distance values (e.g. prior distance values relevant to a current frame), and hidden layer values (e.g., prior hidden layer values relevant to a current frame), or the like. In some examples, distance values computation module 204 may be implemented via a central processing unit or other processor as is discussed further herein. As discussed, in some examples, some or all of the modules distance values computation module 204 may be implemented via different processors.

As shown and as discussed elsewhere herein, distance values computation module 204 may receive features 203 (e.g., via feature extraction module 202) and output indices 208 (e.g., via speech decoder module 206). Distance values computation module 204 may also receive neural network weights, biases, and corrections (e.g., neural network data) via memory stores 1001. Furthermore, distance values computation module 204 may receive prior distance values and/or prior hidden layer values via memory stores 1001. For example, features 203 may provide inputs to an input layer of neural network 301. Neural network 301 may be implemented via a node scoring module that may determine node scores for layers of the neural network, a score bias module that may bias such node scores to generated biased scores, and an output/activation function module that may generate outputs for the nodes based on the biased scores. For example, for hidden layer nodes and input layer nodes, the output/activation function module may implement an activation function to generate an output and for output layer nodes, the output/activation function module may provide the corrected biased scores as the node outputs. As discussed, in some examples, the output layer may be controlled in distances on demand implementations to only provide distance values associated with output indices 208.

Furthermore, distance values approximation module 303 may receive neural network determined distance values either from memory stores 1001 or from neural network 301 and distance values approximation module 303 may, for example, extrapolate distance values based on the received neural network determined distance values. The distance values determined via neural network 301 and/or distance values approximation module 303 may be provided as distance values 205 as discussed herein.

FIG. 11 is a flow diagram illustrating an example process 1100 for providing automatic speech recognition, arranged in accordance with at least some implementations of the present disclosure. Process 1100 may include one or more operations 1101-1103 as illustrated in FIG. 11. Process 1100 may form at least part of a computer-implemented method for providing automatic speech recognition. By way of non-limiting example, process 1100 may form at least part of an automatic speech recognition process for an attained speech recording such as speech recording 201 as undertaken by systems 200 or 1000 as discussed herein. Further, process 1100 will be described herein in reference to system 1200 of FIG. 12.

Figure 12:
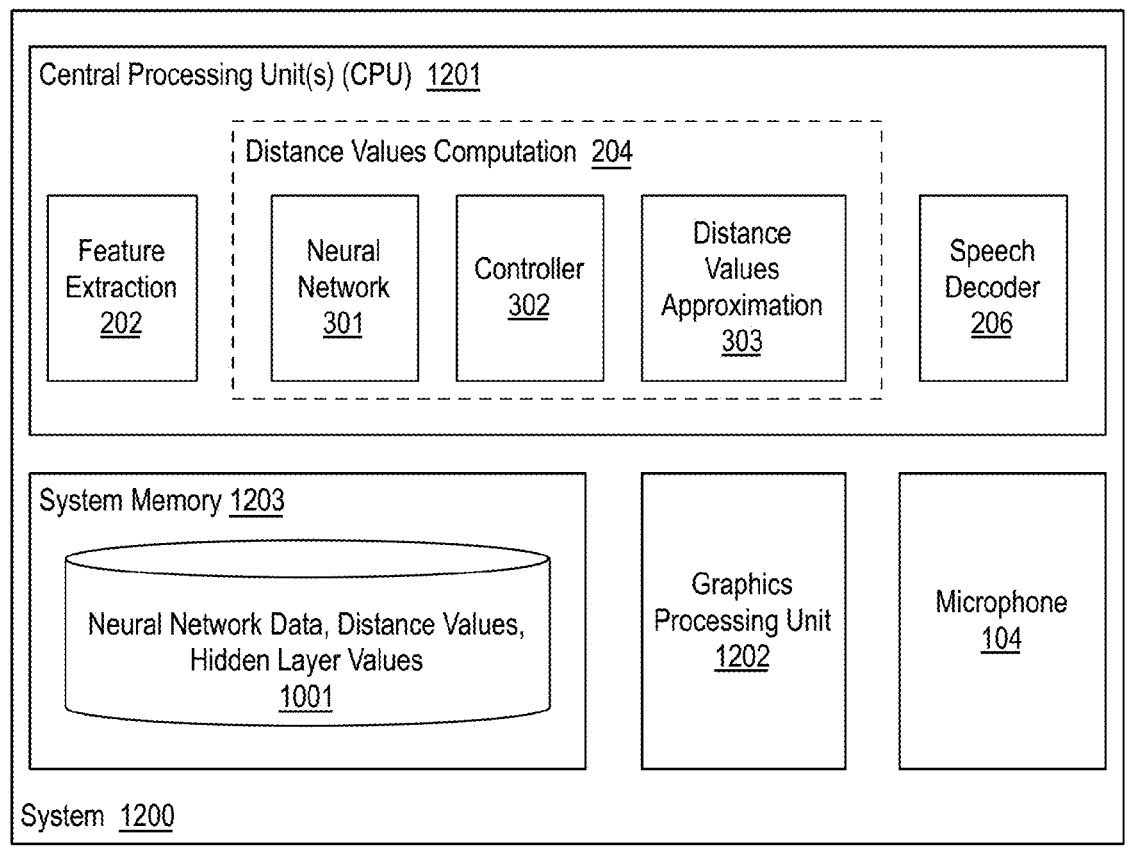
FIG. 12 is an illustrative diagram of an example system for providing speech recognition.

FIG. 12 is an illustrative diagram of an example system 1200 for providing speech recognition, arranged in accordance with at least some implementations of the present disclosure. As shown in FIG. 12, system 1200 may include one or more central processing units (CPU) 1201, a graphics processing unit (GPU) 1202, system memory 1203, and microphone 104. Also as shown, CPU 1201 may include feature extraction module 202, distance values computation module 204, and speech decoder module 206. Furthermore, distance values computation module 204 may include neural network 301, controller 302, and distance values approximation module 303. As shown, in the example of system 1200, system memory 1203 may include memory stores 1001, which may store neural network data, distance values, and/or hidden layer values. Furthermore, system memory 1203 may store any other data as discussed herein such as speech recordings, features, feature vectors, distance values, recognized word sequences, or the like. Microphone 104 may include any suitable device or devices that may receive speech 103 (e.g., as sound waves in the air, please refer to FIG. 1) and convert speech 103 to an electrical signal such as a digital signal. In an embodiment, microphone converts speech 103 to speech recording 201. In an embodiment, speech recording 201 may be stored in system memory 1203 for access by CPU 1201.

CPU 1201 and graphics processing unit 1202 may include any number and type of processing units that may provide the operations as discussed herein. Such operations may be implemented via software or hardware or a combination thereof. For example, graphics processing unit 1202 may include circuitry dedicated to manipulate data obtained from system memory 1203 or dedicated graphics memory (not shown). Furthermore, central processing units 1201 may include any number and type of processing units or modules that may provide control and other high level functions for system 1200 as well as the operations as discussed herein. System memory 1203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, system memory 1203 may be implemented by cache memory. As shown, in an embodiment, feature extraction module 202, distance values computation module 204, and speech decoder module 206 may be implemented via CPU 1201. In some examples, feature extraction module 202, distance values computation module 204, and speech decoder module 206 may be provided by software as implemented via CPU 1201. In other examples, one or more of feature extraction module 202, distance values computation module 204, and speech decoder module 206 may be implemented via a digital signal processor or the like. In another embodiment, one or more of feature extraction module 202, distance values computation module 204, and speech decoder module 206 may be implemented via an execution unit (EU) of graphics processing unit 1202. The EU may include, for example, programmable logic or circuitry such as a logic core or cores that may provide a wide array of programmable logic functions.

Returning to discussion of FIG. 11, process 1100 may begin at operation 1101, "Evaluate a Neural Network to Determine a First Distance Value as an Output of the Neural Network", where a neural network may be evaluated to determine a first distance value as an output of the neural network. For example, the first distance value may be associated with a first time instance. For example, neural network 301 of distance values computation module 204 as implemented via CPU 1201 may determine a distance value as an output of neural network 301.

In some examples, process 1100 may implement a frame skipping technique but not a distances on demand technique as discussed herein. In such examples, the neural network may comprise an output layer having multiple output layer nodes and evaluating the neural network at operation 1101 may include evaluating all of the output nodes of the neural network. In other examples, process 1100 may implement distances on demand techniques with or without frame skipping. In such examples, prior to operation 1101, output indices may be generated for the first time instance (e.g., via a speech decoder). For example, the first distance value may be associated with an output index of the output indices. In such examples, the neural network may include an output layer having multiple output layer nodes such that evaluating the neural network for the first time instance includes evaluating a subset of the multiple output layer nodes such that the subset is associated with the output indices. As discussed, in such examples, a final hidden layer of the neural network having final hidden layer nodes may be fully evaluated for the first time instance and the final hidden layer node values may be saved.

Process 1100 may continue at operation 1102, "Approximate a Second Distance Value for a Subsequent Time Instance based on the Neural Network Determined Distance Value", where, for a second time instance subsequent to the first time instance, a second distance value may be approximated based at least in part on the first distance value and such that the neural network is not evaluated for the second time instance. For example, at the second time instance, no distance values may be direct outputs of the neural network. For example, distance values approximation module 303 of distance values computation module 204 as implemented via CPU 1201 may approximate the second distance value. The second distance value may approximated via extrapolation based on a linear function, a non-linear function, a variance function, or the like. In some examples, the approximation of the second distance value may be based on an extrapolation using the first distance value and a third distance value from a time instance preceding the time instance associated with the first distance value. In some examples, such an extrapolation based on the first and third distance value may be based on a linear extrapolation and the third distance value may have been previous determined via the neural network. In some examples, such an extrapolation may be provided as shown with respect to Equation (1) such that the linear extrapolation includes the first distance value added to half of a difference between the first distance value and the third distance value.

As discussed, in some examples, frame skipping and distances on demand may be implemented together. In such examples, prior to approximating the second distance value, output indices may be generated (e.g., via a speech decoder) for the second time instance. For example, the second distance value may be associated with an output index of the output indices. In such examples, evaluating the neural network at the first time instance may include evaluating all final hidden layer nodes of a final hidden layer to generate final hidden layer values, which may be saved. At the second time instance the neural network for the first time instance may be re-evaluated by evaluating the output layer nodes associated with the output indices for the second time instance based on saved hidden layer values for the first time instance to determine a neural network determined distance value that may be used to approximate the second distance value.

Process 1100 may continue at operation 1103, "Determine a Sequence of Textual Elements based on the First and Second Distance Values", where a sequence of textual elements may be determined based on the first and second distance values. For example, speech decoder module 206 as implemented via CPU 1201 may determine recognized word sequence 207 as discussed herein. In some examples, the speech decoder includes a Viterbi beam searching decoder.

As discussed, process 1100 may implement a frame skipping technique. Such a technique may skip any number of frames. For example, frames determined using a neural network may be described as neural network evaluation frames and frames determined using approximation techniques may be described as skip frames. In some examples, the first time instance may be associated with a neural network evaluation frame, the second time instance may be associated with a skip frame, and the evaluation frame and skip frame may be adjacent frames. In other examples, one, two, three, or more skip frames may be between the evaluation frame and the skip frame. Furthermore, in some examples, a frame skipping rate (e.g., based on accuracy needs, available computing resources, or a current real time factor) may be determined and implemented via controller 302 of distance values computation module 204 as implemented via CPU 1201 to provide additional or remove skip frames from between evaluation frames.

Process 1100 may be repeated any number of times either in series or in parallel for any number of time instances and/or speech recordings. Process 1100 may provide for determining distance values and generating a sequence of textual elements via a device such as device 102 as discussed herein or via a server as part of a cloud computing platform or the like. Also as discussed herein, prior to such processing in real-time, various components of the neural network may be pre-trained, biases and/or weights may be determined, or the like via, in some examples, a separate system. As discussed, in some examples, process 1100 may be implemented via CPU 1201. In other examples, process 1100 (and the associated modules) may be implemented via a dedicated processor such as a co-processor or the like.

Furthermore, prior to operation 1101, in some examples, received speech may be converted to a speech recording. For example, speech 103 may be converted to speech recording 201 via microphone 104 of system 1100 and/or related circuitry. Furthermore, features 203 (e.g., feature vectors) may be determined or extracted based on speech recording 201 by feature extraction module 202 as implemented via CPU 1201 and such features may be provided to neural network 301 of distance values computation module 204 as implemented via CPU 1201. In some examples, feature extraction module 202 may be implemented via a digital signal processor (not shown) of system 1200. In some examples, speech decoder module 206 as implemented via CPU 1201 may determine recognized word sequence 207 by comparing distance values 205 to statistical models (not shown) as attained via system memory 1203.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of systems 200, 1000, or 1200, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
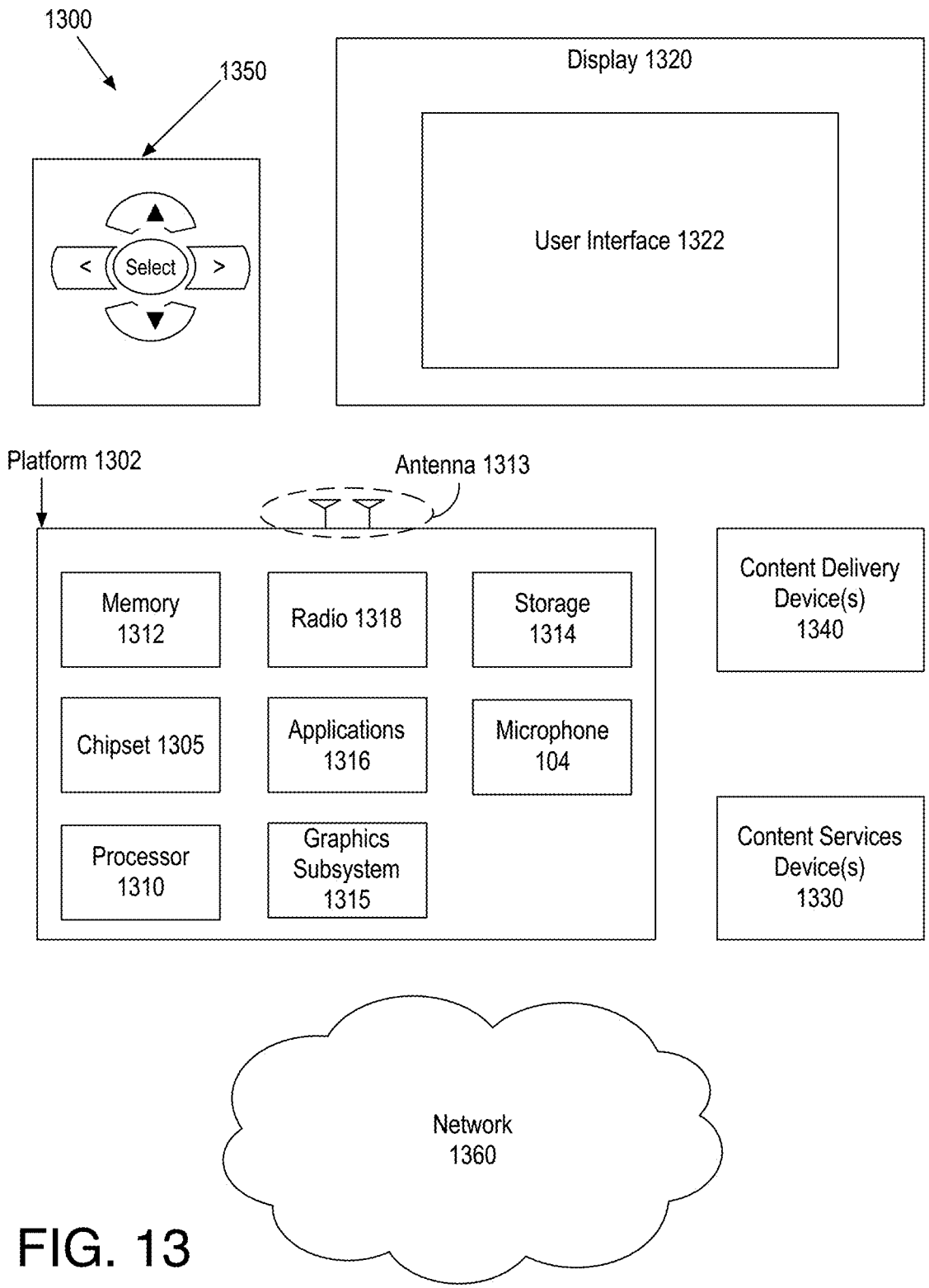
FIG. 13 is an illustrative diagram of an example system.

FIG. 13 is an illustrative diagram of an example system 1300, arranged in accordance with at least some implementations of the present disclosure. In various implementations, system 1300 may be a mobile system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet, smart watch, smart glasses or smart television), mobile internet device (MID), messaging device, data communication device, cameras (e.g. point-and-shoot cameras, super-zoom cameras, digital single-lens reflex (DSLR) cameras), and so forth.

In various implementations, system 1300 includes a platform 1302 coupled to a display 1320. Platform 1302 may receive content from a content device such as content services device(s) 1330 or content delivery device(s) 1340 or other similar content sources. As shown, in some examples, system 1300 may include microphone 104 implemented via platform 1302. Platform 1302 may receive speech such as speech 103 via microphone 104 as discussed herein. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of controller 1350 may be used to interact with user interface 1322, for example. In various embodiments, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In various embodiments, controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

As described above, system 1300 may be embodied in varying physical styles or form factors. FIG. 13 illustrates implementations of a small form factor device 1300 in which system 1300 may be embodied. In various embodiments, for example, device 1300 may be implemented as a mobile computing device a having wireless capabilities. A mobile computing device may refer to any device having a processing system and a mobile power source or supply, such as one or more batteries, for example. In some examples, device 1300 may include a microphone (e.g., microphone 104) and/or receive speech (e.g., speech 103) for real time speech recognition via implementation of neural network as discussed herein.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internes device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 14:
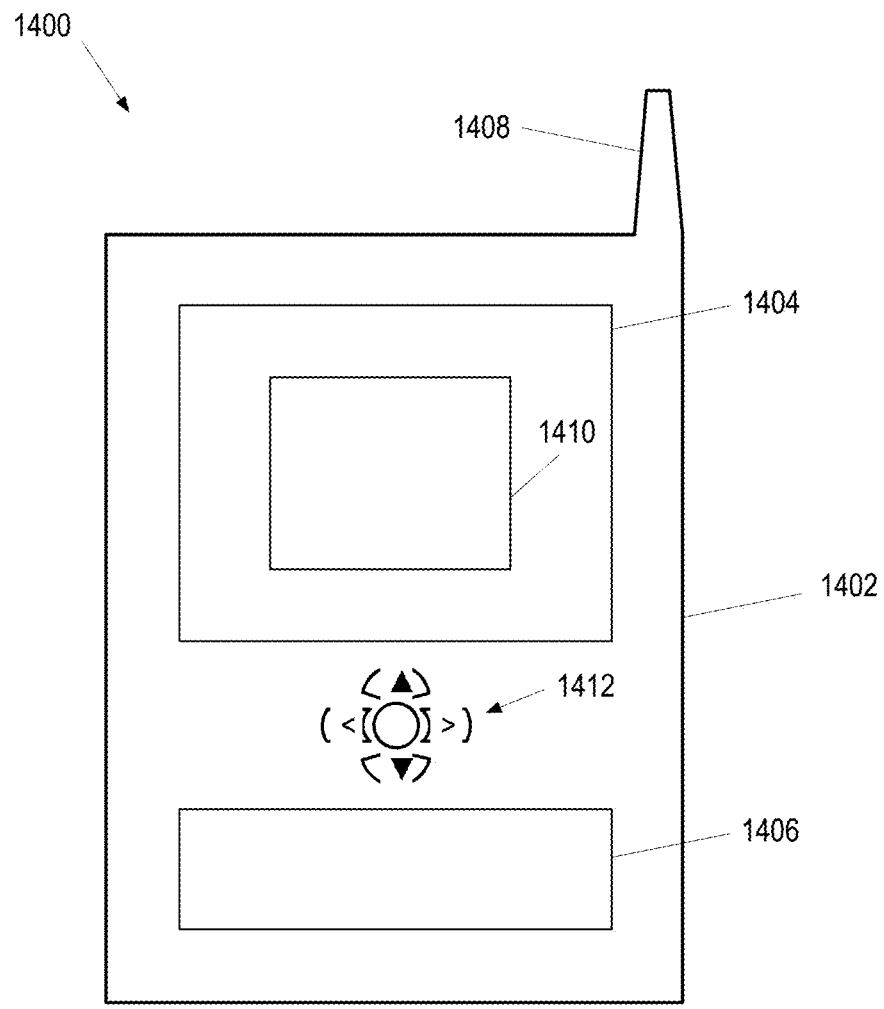
FIG. 14 illustrates an example device, all arranged in accordance with at least some implementations of the present disclosure.

As shown in FIG. 14, device 1400 may include a housing 1402, a display 1404, an input/output (I/O) device 1406, and an antenna 1408. Device 1400 also may include navigation features 1412. Display 1404 may include any suitable display unit for displaying information appropriate for a mobile computing device. Display 1404 may include a touchscreen region 1410 for receiving I/O commands. In some examples, touchscreen region 1410 may be substantially the same size as display 1404. I/O device 1406 may include any suitable I/O device for entering information into a mobile computing device. Examples for I/O device 1406 may include an alphanumeric keyboard, a numeric keypad, a touch pad, input keys, buttons, switches, rocker switches, microphones, speakers, voice recognition device and software, and so forth. Information also may be entered into device 1400 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a computer-implemented method for providing automatic speech recognition comprises evaluating, for a first time instance, a neural network to determine at least one first distance value associated with the first time instance, wherein the at least one first distance value comprises an output from the neural network, approximating, for a second time instance, at least one second distance value based at least in part on the first distance value, wherein the neural network is not evaluated for the second time instance, and determining a sequence of textual elements based at least in part on the first distance value and the second distance value.

Further to the first embodiments, the method further comprises generating one or more output indices for the first time instance, wherein the first distance value is associated with a first output index of the output indices, wherein the neural network comprises an output layer having a plurality of output layer nodes, and wherein evaluating the neural network for the first time instance comprises evaluating only a subset of the plurality of output layer nodes associated with the output indices.

Further to the first embodiments, the method further comprises generating one or more output indices for the first time instance, wherein the first distance value is associated with a first output index of the output indices, wherein the neural network comprises an output layer having a plurality of output layer nodes, and wherein evaluating the neural network for the first time instance comprises evaluating only a subset of the plurality of output layer nodes associated with the output indices, wherein the neural network further comprises a final hidden layer having final hidden layer nodes, and wherein evaluating the neural network for the first time instance comprises evaluating all of the final hidden layer nodes.

Further to the first embodiments, the method further comprises generating one or more output indices for the first time instance, wherein the first distance value is associated with a first output index of the output indices, the neural network comprises an output layer having a plurality of output layer nodes, evaluating the neural network for the first time instance comprises evaluating only a subset of the plurality of output layer nodes associated with the output indices and/or wherein the neural network further comprises a final hidden layer having final hidden layer nodes and evaluating the neural network for the first time instance comprises evaluating all of the final hidden layer nodes.

Further to the first embodiments, approximating the second distance value comprises extrapolating the second distance value based at least in part on the first distance value based on at least one of a linear function, a non-linear function, or a variance function.

Further to the first embodiments, approximating the second distance value comprises extrapolating the second distance value based on the first distance value and a third distance value associated with a third time instance, wherein the first time instance is prior to the second time instance and the third time instance is prior to the first time instance.

Further to the first embodiments, approximating the second distance value comprises extrapolating the second distance value based on the first distance value and a third distance value associated with a third time instance, wherein the first time instance is prior to the second time instance and the third time instance is prior to the first time instance, wherein extrapolating the second distance value comprises extrapolating the second distance value via a linear function based on the first distance value and the third distance value, wherein the third distance value is determined based on an evaluation of the neural network.

Further to the first embodiments, approximating the second distance value comprises extrapolating the second distance value based on the first distance value and a third distance value associated with a third time instance, wherein the first time instance is prior to the second time instance and the third time instance is prior to the first time instance, wherein extrapolating the second distance value comprises extrapolating the second distance value via a linear function based on the first distance value and the third distance value, wherein the third distance value is determined based on an evaluation of the neural network, wherein the linear function comprises the first distance value added to half of a difference between the first distance value and the third distance value.

Further to the first embodiments, approximating the second distance value comprises extrapolating the second distance value based on the first distance value and a third distance value associated with a third time instance, the first time instance being prior to the second time instance and the third time instance being prior to the first time instance, and/or extrapolating the second distance value comprises extrapolating the second distance value via a linear function based on the first distance value and the third distance value, and/or the third distance value is determined based on an evaluation of the neural network.

Further to the first embodiments, the method further comprises generating one or more output indices for the second time instance, wherein a third distance value for the second time instance is associated with a first output index of the output indices, wherein the neural network comprises an output layer having a plurality of output layer nodes and a final hidden layer having a plurality of final hidden layer nodes, and wherein said evaluating the neural network for the first time instance comprises evaluating all final hidden layer nodes of the final hidden layer to generate a plurality of final hidden layer values, determining, at the second time instance, a fourth distance value for the first time instance by evaluating an output layer node of the plurality of output layer nodes associated with the fourth distance value based on the final hidden layer values, and approximating, for the second time instance, the third distance value based at least in part on the fourth distance value.

Further to the first embodiments, the neural network comprises an output layer having a plurality of output layer nodes, and wherein evaluating the neural network for the first time instance comprises evaluating all of the plurality of output layer nodes.

Further to the first embodiments, the first time instance is associated with a neural network evaluation frame, the second time instance is associated with a skip frame, and wherein one, two, or three additional skip frames are between the evaluation frame and the skip frame.

Further to the first embodiments, the neural network comprises an output layer having a plurality of output layer nodes and evaluating the neural network for the first time instance comprises evaluating all of the plurality of output layer nodes, and/or the first time instance is associated with a neural network evaluation frame, the second time instance is associated with a skip frame, and wherein one, two, or three additional skip frames are between the evaluation frame and the skip frame, and/or determining the sequence of textual elements comprises determining the sequence of textual elements via a Viterbi beam searching decoder.

Further to the first embodiments, the first time instance is associated with a neural network evaluation frame, the second time instance is associated with a skip frame, and the method further comprises determining a frame skipping rate based on at least one of available computing resources or a current real time factor and providing an additional skip frame between the evaluation frame and the skip frame based on the frame skipping rate.

Further to the first embodiments, determining the sequence of textual elements comprises determining the sequence of textual elements via a Viterbi beam searching decoder.

Further to the first embodiments, the method further comprises converting received speech to a speech recording, extracting feature vectors associated with time windows of the speech recording, and providing the feature vectors as input to the neural network.

In one or more second embodiments, a system for providing a providing automatic speech recognition comprises a memory configured to store speech recognition data and a central processing unit coupled to the memory, wherein the central processing unit comprises neural network circuitry configured to implement, for a first time instance, a neural network to determine at least one first distance value associated with the first time instance, distance value approximation circuitry configured to approximate, for a second time instance, at least one second distance value based at least in part on the first distance value, and speech decoder circuitry configured to determine a sequence of textual elements based at least in part on the first distance value and the second distance value.

Further to the second embodiments, the speech decoder circuitry is further configured to generate one or more output indices for the first time instance, wherein the first distance value is associated with a first output index of the output indices, wherein the neural network comprises an output layer having a plurality of output layer nodes, and wherein the neural network circuitry is configured to evaluate only a subset of the plurality of output layer nodes associated with the output indices for the first time instance.

Further to the second embodiments, the speech decoder circuitry is further configured to generate one or more output indices for the first time instance, wherein the first distance value is associated with a first output index of the output indices, wherein the neural network comprises an output layer having a plurality of output layer nodes, and wherein the neural network circuitry is configured to evaluate only a subset of the plurality of output layer nodes associated with the output indices for the first time instance, wherein the neural network further comprises a final hidden layer having final hidden layer nodes, and wherein the neural network circuitry is configured to evaluate all of the final hidden layer nodes for the first time instance.

Further to the second embodiments, the speech decoder circuitry is further configured to generate one or more output indices for the first time instance, the first distance value being associated with a first output index of the output indices, the neural network comprising an output layer having a plurality of output layer nodes, and the neural network circuitry being configured to evaluate only a subset of the plurality of output layer nodes associated with the output indices for the first time instance, and/or the neural network further comprises a final hidden layer having final hidden layer nodes, the neural network circuitry being configured to evaluate all of the final hidden layer nodes for the first time instance.

Further to the second embodiments, the distance value approximation circuitry being configured to approximate the second distance value comprises the distance value approximation circuitry being configured to extrapolate the second distance value based on the first distance value and a third distance value associated with a third time instance, wherein the first time instance is prior to the second time instance and the third time instance is prior to the first time instance.

Further to the second embodiments, the distance value approximation circuitry is configured to extrapolate the second distance via a linear function based on the first distance value and the third distance value, wherein the neural network circuitry is configured to implement the neural network to determine the third distance value.

Further to the second embodiments, the distance value approximation circuitry being configured to approximate the second distance value comprises the distance value approximation circuitry being configured to extrapolate the second distance value via a linear function based on the first distance value and a third distance value associated with a third time instance, the first time instance being prior to the second time instance and the third time instance being prior to the first time instance, and/or the third distance value is determined based on an evaluation of the neural network.

Further to the second embodiments, the distance value approximation circuitry being configured to approximate the second distance value comprises the distance value approximation circuitry being configured to extrapolate the second distance value via a linear function based on the first distance value and a third distance value associated with a third time instance, wherein the first time instance is prior to the second time instance and the third time instance is prior to the first time instance, wherein the third distance value is determined based on an evaluation of the neural network.

Further to the second embodiments, the speech decoder circuitry is further configured to generate one or more output indices for the second time instance, wherein a third distance value for the second time instance is associated with a first output index of the output indices, wherein the neural network comprises an output layer having a plurality of output layer nodes and a final hidden layer having a plurality of final hidden layer nodes, and wherein the neural network circuitry is configured to evaluate all final hidden layer nodes for the first time instance to generate a plurality of final hidden layer values, wherein the neural network circuitry is further configured to determine, at the second time instance, a fourth distance value for the first time instance by evaluating an output layer node of the plurality of output layer nodes associated with the fourth distance value based on the final hidden layer values, and wherein the distance value approximation circuitry is configured to approximate, for the second time instance, the third distance value based at least in part on the fourth distance value.

Further to the second embodiments, the neural network comprises an output layer having a plurality of output layer nodes, and wherein the neural network circuitry being configured to evaluate the neural network for the first time instance comprises the neural network circuitry being configured to evaluate all of the plurality of output layer nodes.

Further to the second embodiments, the first time instance is associated with a neural network evaluation frame, the second time instance is associated with a skip frame, and wherein one, two, or three additional skip frames are between the evaluation frame and the skip frame.

Further to the second embodiments, the speech decoder circuitry comprises a Viterbi beam searching decoder.

Further to the second embodiments, the system further comprises feature extraction circuitry configured to extract feature vectors associated with time windows of a speech recording and controller circuitry configured to determine a frame skipping rate based on at least one of available computing resources of the system or a current real time factor.

In one or more third embodiments, a system for providing a providing automatic speech recognition comprises means for evaluating, for a first time instance, a neural network to determine at least one first distance value associated with the first time instance, wherein the at least one first distance value comprises an output from the neural network, means for approximating, for a second time instance, at least one second distance value based at least in part on the first distance value, wherein the neural network is not evaluated for the second time instance, and means for determining a sequence of textual elements based at least in part on the first distance value and the second distance value.

Further to the third embodiments, the system further comprises means for generating one or more output indices for the first time instance, wherein the first distance value is associated with a first output index of the output indices, wherein the neural network comprises an output layer having a plurality of output layer nodes and a final hidden layer having final hidden layer nodes, and wherein evaluating the neural network for the first time instance comprises evaluating only a subset of the plurality of output layer nodes associated with the output indices and evaluating all of the final hidden layer nodes.

Further to the third embodiments, approximating the second distance value comprises extrapolating the second distance value via a linear function based on the first distance value and a third distance value associated with a third time instance, wherein the first time instance is prior to the second time instance and the third time instance is prior to the first time instance, and wherein the third distance value is determined based on an evaluation of the neural network.

In one or more fourth embodiments, at least one machine readable medium comprises a plurality of instructions that, in response to being executed on a computing device, cause the computing device to provide automatic speech recognition by evaluating, for a first time instance, a neural network to determine at least one first distance value associated with the first time instance, wherein the at least one first distance value comprises an output from the neural network, approximating, for a second time instance, at least one second distance value based at least in part on the first distance value, wherein the neural network is not evaluated for the second time instance, and determining a sequence of textual elements based at least in part on the first distance value and the second distance value.

Further to the fourth embodiments, the machine readable medium further comprises instructions that, in response to being executed on the computing device, cause the computing device to perform speech recognition by generating one or more output indices for the first time instance, wherein the first distance value is associated with a first output index of the output indices, wherein the neural network comprises an output layer having a plurality of output layer nodes, and wherein evaluating the neural network for the first time instance comprises evaluating only a subset of the plurality of output layer nodes associated with the output indices.

Further to the fourth embodiments, approximating the second distance value comprises extrapolating the second distance value via a linear function based on the first distance value and a third distance value associated with a third time instance, wherein the first time instance is prior to the second time instance and the third time instance is prior to the first time instance, wherein the third distance value is determined based on an evaluation of the neural network.

Further to the fourth embodiments, the machine readable medium further comprises instructions that, in response to being executed on the computing device, cause the computing device to perform speech recognition by generating one or more output indices for the second time instance, wherein a third distance value for the second time instance is associated with a first output index of the output indices, wherein the neural network comprises an output layer having a plurality of output layer nodes and a final hidden layer having a plurality of final hidden layer nodes, and wherein said evaluating the neural network for the first time instance comprises evaluating all final hidden layer nodes of the final hidden layer to generate a plurality of final hidden layer values, determining, at the second time instance, a fourth distance value for the first time instance by evaluating an output layer node of the plurality of output layer nodes associated with the fourth distance value based on the final hidden layer values, and approximating, for the second time instance, the third distance value based at least in part on the fourth distance value.

Further to the fourth embodiments, the machine readable medium further comprises instructions that, in response to being executed on the computing device, cause the computing device to perform speech recognition by converting received speech to a speech recording, extracting feature vectors associated with time windows of the speech recording, and providing the feature vectors as input to the neural network.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for providing automatic speech recognition comprising:
   receiving, by a microphone, speech for evaluation;
   converting the received speech to a speech recording;
   extracting features from the speech recording;
   evaluating, for a first time instance, a neural network based on the extracted features to determine a first distance value associated with the first time instance, wherein the first distance value corresponds to an output node from the neural network;
   evaluating, for a second time instance, the neural network based on the extracted features to determine a second distance value associated with the second time instance, wherein the second distance value corresponds to the output node from the neural network;
   approximating, for a third time instance, a third distance value based on at least one of an extrapolation or an interpolation of the first and second distance values, wherein the neural network is not evaluated for the third time instance;
   converting the speech recording to a recognized word sequence based on a plurality of distance values comprising the first, the second, and the third distance values; and
   storing the recognized word sequence in a system memory.

2. The method of claim 1, further comprising:
   generating one or more output indices for the first time instance, wherein the first distance value is associated with a first output index of the output indices, wherein the neural network comprises an output layer having a plurality of output layer nodes, and wherein evaluating the neural network for the first time instance comprises evaluating only a subset of the plurality of output layer nodes associated with the output indices.

3. The method of claim 2, wherein the neural network further comprises a final hidden layer having final hidden layer nodes, and wherein evaluating the neural network for the first time instance comprises evaluating all of the final hidden layer nodes.

4. The method of claim 1, wherein approximating the third distance value comprises extrapolating the third distance value based on at least one of a linear function, a non-linear function, or a variance function.

5. The method of claim 1, wherein approximating the third distance value comprises extrapolating the third distance value, wherein the first and second time instances are prior to the third time instance.

6. The method of claim 5, wherein extrapolating the third distance value comprises extrapolating the third distance value via a linear function based on the first distance value and the second distance value, and wherein the linear function comprises the second distance value added to half of a difference between the first distance value and the second distance value.

7. The method of claim 1, wherein the neural network comprises an output layer having a plurality of output layer nodes, and wherein evaluating the neural network for the first time instance comprises evaluating all of the plurality of output layer nodes.

8. The method of claim 1, wherein the second time instance is associated with a neural network evaluation frame, the third time instance is associated with a skip frame, and wherein one, two, or three additional skip frames are between the evaluation frame and the skip frame.

9. The method of claim 1, wherein the second time instance is associated with a neural network evaluation frame, the third time instance is associated with a skip frame, and the method further comprises:
   determining a frame skipping rate based on at least one of available computing resources or a current real time factor; and
   providing an additional skip frame between the evaluation frame and the skip frame based on the frame skipping rate.

10. The method of claim 1, wherein converting the speech recording to the recognized word sequence comprises decoding the plurality of distance values via a Viterbi beam searching decoder.

11. A system for providing automatic speech recognition comprising:
   a microphone to receive speech and convert the received speech to a digital signal;
   a system memory configured to store a speech recording corresponding to the digital signal; and
   a central processing unit coupled to the memory, the central processing unit to extract features from the speech recording, to implement, for a first time instance, a neural network based on the extracted features to determine a first distance value associated with the first time instance, wherein the first distance value corresponds to an output node from the neural network, to implement, for a second time instance, the neural network based on the extracted features to determine a second distance value associated with the second time instance, wherein the second distance value corresponds to the output node from the neural network, to approximate, for a third time instance, a third distance value based on at least one of an extrapolation or an interpolation of the first and second distance values, and to convert decode the speech recording to a recognized word sequence based on a plurality of distance values comprising the first, the second, and the third distance values, and to determine a recognized word sequence corresponding to the speech recording to store the recognized word sequence in the system memory.

12. The system of claim 11, wherein the central processing unit is to generate one or more output indices for the first time instance, wherein the first distance value is associated with a first output index of the output indices, wherein the neural network comprises an output layer having a plurality of output layer nodes, and wherein the neural network circuitry is configured to evaluate only a subset of the plurality of output layer nodes associated with the output indices for the first time instance.

13. The system of claim 12, wherein the neural network further comprises a final hidden layer having final hidden layer nodes, and wherein central processing unit is to evaluate all of the final hidden layer nodes for the first time instance.

14. The system of claim 11, wherein the central processing unit to approximate the third distance value comprises the central processing unit to extrapolate the third distance value via a linear function based on the first and second distance values.

15. The system of claim 11, wherein the second time instance is associated with a neural network evaluation frame, the third time instance is associated with a skip frame, and wherein one, two, or three additional skip frames are between the evaluation frame and the skip frame.

16. The system of claim 11, wherein the central processing unit is to determine a frame skipping rate based on at least one of available computing resources of the system or a current real time factor.

17. At least one non-transitory machine readable medium comprising a plurality of instructions that, in response to being executed on a computing device, cause the computing device to perform a method comprising:
receiving, by a microphone, speech for evaluation;
converting the received speech to a speech recording;
extracting features from the speech recording;
evaluating, for a first time instance, a neural network based on the extracted features to determine a first distance value associated with the first time instance, wherein the first distance value corresponds to an output node from the neural network;
evaluating, for a second time instance, the neural network based on the extracted features to determine a second distance value associated with the second time instance, wherein the second distance value corresponds to the output node from the neural network;
approximating, for a third time instance, a third distance value based on at least one of an extrapolation or an interpolation of the first and second distance values, wherein the neural network is not evaluated for the third time instance;
converting the speech recording to a recognized word sequence based on a plurality of distance values comprising the first, the second, and the third distance values; and
storing the recognized word sequence in a system memory.

18. The machine readable medium of claim 17 further comprising instructions that, in response to being executed on the computing device, cause the computing device to perform speech recognition by:
generating one or more output indices for the first time instance, wherein the first distance value is associated with a first output index of the output indices, wherein the neural network comprises an output layer having a plurality of output layer nodes, and wherein evaluating the neural network for the first time instance comprises evaluating only a subset of the plurality of output layer nodes associated with the output indices.

19. The machine readable medium of claim 17, wherein approximating the third distance value comprises extrapolating the third distance value via a linear function based on the first and second distance values.

20. The machine readable medium of claim 17, wherein the second time instance is associated with a neural network evaluation frame, the third time instance is associated with a skip frame, and wherein one, two, or three additional skip frames are between the evaluation frame and the skip frame.

21. The machine readable medium of claim 17, wherein the second time instance is associated with a neural network evaluation frame and the third time instance is associated with a skip frame, the machine readable medium further comprising instructions that, in response to being executed on the computing device, cause the computing device to perform speech recognition by:
determining a frame skipping rate based on at least one of available computing resources or a current real time factor; and
providing an additional skip frame between the evaluation frame and the skip frame based on the frame skipping rate.

\* \* \* \* \*